(12) United States Patent
Lee

(10) Patent No.: US 9,888,082 B2
(45) Date of Patent: Feb. 6, 2018

(54) SYSTEM AND METHOD OF CONTROLLING DATA TRANSMISSION OF EXTERNAL APPARATUS CONNECTED TO GATEWAY

(71) Applicant: SAMSUNG ELECTRONICS CO., LTD., Suwon-si (KR)

(72) Inventor: Jae-keun Lee, Seoul (KR)

(73) Assignee: SAMSUNG ELECTRONICS CO., LTD., Suwon-Si (KR)

(*) Notice: Subject to any disclaimer, the term of this patent is extended or adjusted under 35 U.S.C. 154(b) by 124 days.

(21) Appl. No.: 14/813,193

(22) Filed: Jul. 30, 2015

(65) Prior Publication Data

US 2016/0036918 A1 Feb. 4, 2016

(30) Foreign Application Priority Data

Jul. 31, 2014 (KR) ........................ 10-2014-0098648
Nov. 19, 2014 (KR) ........................ 10-2014-0161633
Mar. 27, 2015 (KR) ........................ 10-2015-0043304

(51) Int. Cl.
| | | |
|---|---|---|
| *H04L 29/08* | (2006.01) | |
| *G06F 9/50* | (2006.01) | |
| *H04L 12/26* | (2006.01) | |
| *H04L 12/851* | (2013.01) | |
| *H04L 12/911* | (2013.01) | |
| *H04L 12/923* | (2013.01) | |

(52) U.S. Cl.
CPC ............ *H04L 67/125* (2013.01); *G06F 9/505* (2013.01); *H04L 43/0876* (2013.01); *H04L 47/24* (2013.01); *H04L 47/745* (2013.01); *H04L 47/762* (2013.01); *H04L 67/322* (2013.01)

(58) Field of Classification Search
CPC ................ H04L 43/0876; H04L 47/14; H04L 47/26–47/266; H04L 47/74; H04L 47/743; H04L 47/762; H04L 47/822; H04L 67/12; H04L 67/125; G06F 9/505
See application file for complete search history.

(56) References Cited

U.S. PATENT DOCUMENTS

| | | | |
|---|---|---|---|
| 2005/0055432 A1 | 3/2005 | Rodgers | |
| 2007/0237083 A9* | 10/2007 | Oh .......................... | H04L 12/66 370/235 |
| 2008/0031139 A1* | 2/2008 | Muro ..................... | H04L 67/101 370/237 |
| 2008/0150714 A1 | 6/2008 | Bauer et al. | |
| 2009/0092112 A1 | 4/2009 | Kim et al. | |

(Continued)

FOREIGN PATENT DOCUMENTS

| | | |
|---|---|---|
| EP | 2498185 A1 | 9/2012 |
| KR | 10-1048854 B1 | 7/2011 |
| WO | 03015452 A2 | 2/2003 |

OTHER PUBLICATIONS

Communication dated Apr. 6, 2016, issued by the European Patent Office in counterpart European Application No. 15179241.3.

(Continued)

*Primary Examiner* — Pao Sinkantarakorn
(74) *Attorney, Agent, or Firm* — Sughrue Mion, PLLC

(57) ABSTRACT

A system and method of controlling data transmission from a device connected to a gateway includes: determining a resource utilization rate of the gateway, and determining a data processing method of the device in accordance with the utilization rate of the gateway.

19 Claims, 25 Drawing Sheets

(56) References Cited

U.S. PATENT DOCUMENTS

| 2010/0199282 A1 | 8/2010 | Richter et al. |
| 2012/0116724 A1 | 5/2012 | Takara et al. |
| 2012/0197856 A1 | 8/2012 | Banka et al. |
| 2013/0128786 A1 | 5/2013 | Sultan et al. |
| 2014/0149262 A1 | 5/2014 | Parekh et al. |
| 2014/0153568 A1 | 6/2014 | Gasparakis |

OTHER PUBLICATIONS

Communication dated Dec. 15, 2015 by the European Patent Office in European Application No. 15179241.3.
International Search Report and Written Opinion dated Oct. 29, 2015 by International Searching Authority in International Application No. PCT/KR2015/007675 (PCT/ISA/210 & PCT/ISA/237).
Ashwini D. Karanjawane et al., "Designing Path Assured Data Transfer Protocol for Wireless Sensor Network", International Journal of Engineering Research & Technology(IJERT), IJERTV2IS110558, vol. No. 2, Issue No. 11, Nov. 2013. (11 Pages Total).

\* cited by examiner

FIG. 4

| DEVICE ID /40 | KIND OF DEVICE /42 | DATA TYPE /44 | DATA PROPERTY /46 | SENSING PERIOD /48 |
|---|---|---|---|---|
| DEVICE A | TEMPERATURE SENSOR | NUMBER | Number value | 1 per an hour |
| DEVICE B | TEMPERATURE SENSOR | NUMBER | Number value | 1 per an hour |
| DEVICE C | SOUND SENSOR | SOUND | data value | 0.1 per an hour |
| DEVICE D | GAS SENSOR | LETTER | Byte value | 0.1 per an hour |
| DEVICE E | GAS SENSOR | LETTER | Byte value | 1 per a minute |
| ... | ... | ... | ... | ... |

FIG. 5

| SERVICE ID | NECESSARY DEVICE | PRIORITY ORDER 1 | PRIORITY ORDER 2 | PRIORITY ORDER 3 |
|---|---|---|---|---|
| FIRE ALARM SERVICE A | TWO TEMPERATURE SENSORS THREE GAS SENSORS ONE FIRE ALARM ...... | ONE TEMPERATURE SENSOR ONE GAS SENSOR ONE FIRE ALARM | ONE TEMPERATURE SENSOR ONE GAS SENSOR | ONE GAS SENSOR |
| HOME CONTROL SERVICE B | TWO TEMPERATURE SENSORS TWO HUMIDITY SENSORS TWO DEHUMIDIFIERS ONE AIR CONDITIONER ...... | ONE TEMPERATURE SENSOR ONE HUMIDITY SENSOR | ONE DEHUMIDIFIER ONE AIR CONDITIONER | ONE TEMPERATURE SENSOR ONE HUMIDITY SENSOR ONE DEHUMIDIFIER |
| ...... | ...... | ...... | ...... | ...... |

FIG. 6

| DEVICE ID /40 | KIND OF DEVICE /42 | DATA TYPE /44 | DATA PROPERTY /46 | SENSING PERIOD /48 | ASSOCIATED SERVICE /60 |
|---|---|---|---|---|---|
| DEVICE A | TEMPERATURE SENSOR | NUMBER | Number value | 1 per an hour | HOME CONTROL SERVICE B, FIRE ALARM SERVICE A |
| DEVICE B | TEMPERATURE SENSOR | NUMBER | Number value | 1 per an hour | HOME CONTROL SERVICE B, FIRE ALARM SERVICE A |
| DEVICE C | SOUND SENSOR | SOUND | data value | 0.1 per an hour | HOME CONTROL SERVICE B, SECURITY SERVICE C |
| DEVICE D | GAS SENSOR | LETTER | Byte value | 0.1 per an hour | FIRE ALARM SERVICE A |
| DEVICE E | GAS SENSOR | LETTER | Byte value | 0.1 per an hour | FIRE ALARM SERVICE A |
| ... | ... | ... | ... | ... | ... |

FIG. 8

| SERVICE ID | RESOURCE UTILIZATION RATE | EXTERNAL DEVICE | PAUSE | DATA PROVIDING METHOD | TRANSMISSION PERIOD | SCHEDULED TRANSMISSION |
|---|---|---|---|---|---|---|
| FIRE ALARM SERVICE A | 0~70% | TEMPERATURE SENSOR A | no | default | default | default |
| | | TEMPERATURE SENSOR B | no | default | default | default |
| | | GAS SENSOR A | no | default | default | default |
| | | GAS SENSOR B | no | default | default | default |
| | | GAS SENSOR C | no | default | default | default |
| | | FIRE ALARM | no | default | default | default |
| | 70~100% | TEMPERATURE SENSOR A | no | AVERAGE | 0.5 per 1 hour | no |
| | | TEMPERATURE SENSOR B | yes | – | – | – |
| | | GAS SENSOR A | no | SEPARATION | 1 per 2 minutes | – |
| | | GAS SENSOR B | no | COMBINATION | – | yes |
| | | GAS SENSOR C | yes | – | – | – |
| | | FIRE ALARM | no | default | default | default |
| ... | ... | ... | ... | ... | ... | ... |

SYSTEM AND METHOD OF CONTROLLING DATA TRANSMISSION OF EXTERNAL APPARATUS CONNECTED TO GATEWAY

RELATED APPLICATION

This application claims priority from Korean Patent Application No. 10-2014-0098648, filed on Jul. 31, 2014, in the Korean Intellectual Property Office, Korean Patent Application No. 10-2014-0161633, filed on Nov. 19, 2014, in the Korean Intellectual Property Office, and Korean Patent Application No. 10-2015-0043304, filed on Mar. 27, 2015, in the Korean Intellectual Property Office, the disclosures of which are incorporated herein by reference in their entireties.

BACKGROUND

1. Field

Methods and apparatuses consistent with exemplary embodiments relate to a system and method of controlling data transmission of an apparatus connected to a gateway, and more particularly, to a system and method of controlling data transmission of an apparatus according to a resource utilization rate of a gateway.

2. Description of the Related Art

As a network technology and a data processing technology have developed, various external devices are connected to a gateway to exchange data with the gateway by using a messaging framework. In particular, Internet of Things (IOT) devices exchange data with the gateway by using a messaging framework. In an IOT service, connectivity between a device and a gateway is classified as an internet protocol (IP)-based connectivity and a non-IP based connectivity, the IP-based connectivity being mainly employed. For example, messaging frameworks using transmission control protocol (TCP)/IP do not provide flow control functions, but are dependent upon functions provided by the TCP. However, the flow control provided by TCP does not react to various situations, but only takes into account a network buffer.

In addition, data collected from external devices have importance and real-time characteristics that vary depending on a kind of the data and a kind of service using the data, but message frameworks may not take into account such characteristics. Accordingly, a gateway receiving data from various external devices risks overloading. Also, in a case of a service having high real-time characteristics, it is difficult to provide proper service due to the overloading of the gateway.

SUMMARY

Aspects of exemplary embodiments include a system and method of preventing data loss or service termination provided via a gateway, by preventing overloading of the gateway.

Aspects of exemplary embodiments include a system and method of effectively controlling data transmission of devices through the gateway according to a resource utilization rate of the gateway.

Additional aspects will be set forth in part in the description which follows and, in part, will be apparent from the description, or may be learned by practice of the presented exemplary embodiments.

According to an exemplary embodiment, there is provided a gateway for controlling at least one external device, the gateway including: a controller configured to determine a resource utilization rate of the gateway and to determine a data providing method of providing sensing data from the at least one external device to the gateway according to the resource utilization rate of the gateway; and a communicator configured to transmit, to the at least one external device, a signal that instructs the at least one external device to provide the sensing data according to the data providing method.

The data providing method may include at least one data providing method selected from a data providing method of combining the sensing data, a data providing method of dividing the sensing data, and a data providing method of calculating an average value of the sensing data.

The controller may determine the data providing method based on at least one of a kind of the sensing data of the at least one external device and a size of the sensing data of the at least one external device.

The controller may select an external device among the at least one external device and determine the data providing method of the sensing data that is to be transmitted from the selected external device, when the resource utilization rate exceeds a critical value.

The communicator may transmit the signal for requesting the sensing data to the selected external device, and transmit to unselected external devices that are not selected, a signal for requesting the unselected external devices to pause the transmission of the sensing data.

The controller may determine a transmission period of the sensing data from the at least one external device, and the communicator is further configured to transmit, to the at least one external device, the signal for requesting the at least one external device to provide the sensing data according to the determined transmission period.

The gateway may further include a memory for storing device information of the external device, wherein the device information may include information about a kind of the external device, a kind of the sensing data of the external device, and a sensing period of the external device.

The memory may store the device information in association with a service provided by a device or a server connected to the gateway, and the controller is further configured to select a necessary external device from among the at least one external device for providing the sensing data used to provide the service.

The resource utilization rate may be determined based on at least one selected from a central processing unit (CPU) usage of the gateway, a memory usage of the gateway, and a communication state of the gateway.

The communicator may transmit, to the external device, a message requesting the external device to provide the sensing data according to a default transmission rule, when the resource utilization rate returns to a critical value.

According to an exemplary embodiment, there is provided a method for a gateway to control at least one external device, the method including: determining a resource utilization rate of the gateway; determining a data providing method of providing sensing data to the gateway from the at least one external device according to the resource utilization rate; and transmitting, to the at least one external device, a signal that instructs the at least one external device to provide the sending data according to the determined data providing method.

The data providing method may include at least one data providing method selected from a data providing method of combining the sensing data, a data providing method of dividing the sensing data, and a data providing method of calculating an average value of the sensing data.

The determining of the data providing method may be made based on at least one of a kind of the sensing data of the external device and a size of the sensing data.

The method may further include selecting an external device among the at least one external device when the resource utilization rate exceeds a critical value, wherein the determining of the data providing method comprises determining the data providing method of the sensing data that is to be provided from the selected external device.

The transmitting of the control message may include transmitting a signal for requesting the processed sensing data to the selected external device, and transmitting, to unselected external devices that are not selected, a message for requesting the unselected external devices to pause the transmission of the sensing data.

The method may further include determining a transmission period of the sensing data from the at least one external device, wherein the transmitting of the message comprises transmitting, to the at least one external device, a signal for requesting the at least one external device to provide the sensing data according to the transmission period that is determined.

The method may further include storing the device information of the identified external device, wherein the device information of the external device may include information about a kind of the external device, a kind of the sensing data of the external device, and a sensing period of the external device.

The storing of the device information may include storing the device information in association with a service provided by a device or a server connected to the gateway, and the selecting comprises selecting a necessary external device, from among the at least one external device for providing sensing data used to provide the service.

According to an exemplary embodiment, a device connected to a gateway to provide sensing data to the gateway, the device includes: a sensor configured to obtain sensing data; a controller configured to process the sensing data according to a data providing method of providing the sensing data to the gateway, the data providing method corresponding to a resource utilization rate of the gateway; and a communicator configured to transmit the sensing data to the gateway.

According to an exemplary embodiment, a non-transitory computer-readable recording medium has embodied thereon a program for executing the method for a gateway to control at least one external device in a computer.

According to an exemplary embodiment, a gateway for controlling at least one external device, the gateway includes: a communicator configured to receive sensing data from the at least one external device; and a controller configured to determine a period of processing the sensing data based on at least one selected from a resource utilization rate of the gateway, status information of the at least one external device, and a quantity of at least one external device connected to the gateway.

BRIEF DESCRIPTION OF THE DRAWINGS

The above and other aspects will become apparent and more readily appreciated from the following description of the exemplary embodiments, taken in conjunction with the accompanying drawings in which:

FIG. 4 is a diagram showing an example of a device information table representing device information of the external device, according to an exemplary embodiment;

FIG. 5 is a diagram showing an example of a service information table representing service information about services provided by the device or the server, according to an exemplary embodiment;

FIG. 6 is a diagram showing an example of a device information table representing device information that is stored to be linked with services, according to an exemplary embodiment;

FIG. 8 is a diagram showing an example of a table representing data transmission rules of sensing data, according to an exemplary embodiment;

DETAILED DESCRIPTION

Figure 1:
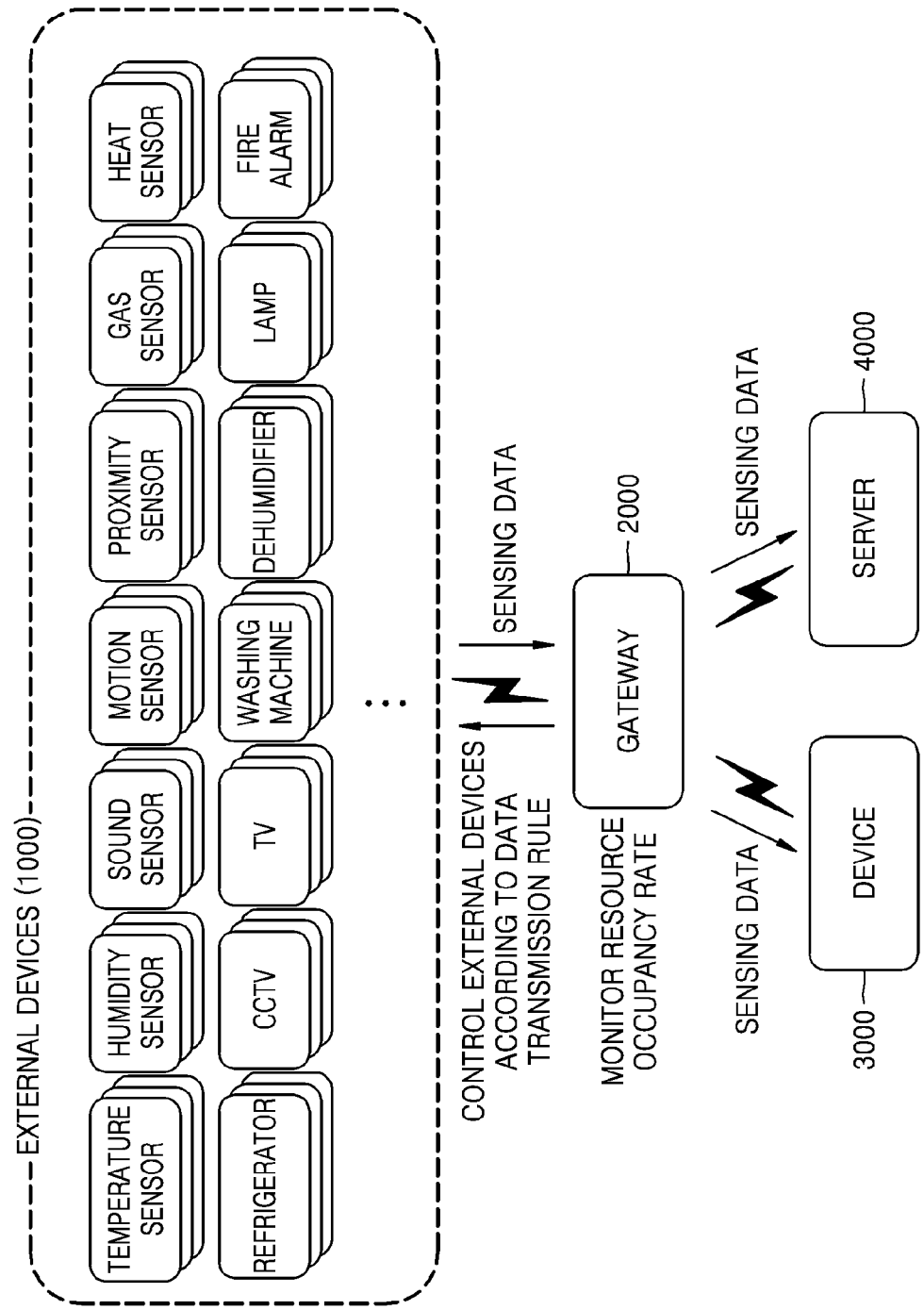
FIG. 1 is a conceptual view of a service providing system according to an exemplary embodiment.

Hereinafter, exemplary embodiments will be described more fully with reference to the accompanying drawings. However, the exemplary embodiments may be embodied in many different forms and should not be construed as being limited to the exemplary embodiments set forth herein; rather, these exemplary embodiments are provided so that this disclosure will be thorough and complete, and will fully convey the concept of the one or more exemplary embodiments to those of ordinary skill in the art. In the following description, well-known functions or constructions will not be described in detail so as not to obscure the one or more exemplary embodiments with unnecessary detail. Also, throughout the specification, like reference numerals in the drawings denote like elements.

Throughout the specification, it will also be understood that when an element is referred to as being "connected to" another element, it can be directly connected to the other element, or electrically connected to the other element while intervening elements may also be present. Throughout the specification, when a part "includes" or "comprises" an element, unless there is a particular description contrary thereto, the part can further include other elements, not excluding the other elements. As used herein, the term "and/or" includes any and all combinations of one or more of the associated listed items. Expressions such as "at least one of," when preceding a list of elements, modify the entire list of elements and do not modify the individual elements of the list.

Also, in the present specification, an external device may be a device that is connected to a gateway to provide sensing data to the gateway for a certain service provided through the gateway. For example, an external device may be a general device (or object) that is connected to a gateway and applied to Internet of Things (IOT), and may be used in a service environment, such as home networking service (e.g., smart-home), or a smart grid. For example, an external device may include a temperature sensor, a humidity sensor, a sound sensor, a motion sensor, a proximity sensor, a gas sensor, a heat sensor, a refrigerator, a closed circuit TV (CCTV), a TV, a washing machine, a dehumidifier, a lamp, a fire alarm, etc., but the device is not limited thereto.

Also, in the present specification, a gateway may be a device or a server capable of controlling external devices. For example, a gateway may be a smartphone, a tablet personal computer (PC), a PC, smart TV, a mobile phone, a personal digital assistant (PDA), a laptop, a media player, a micro server, a global positioning system (GPS), a digital broadcasting terminal, a navigation system, a kiosk, and other mobile or non-mobile computing devices, but is not limited thereto. For example, a gateway may be a game station that users may use in houses, and in this case, the game station may be connected to a gateway in the house via a network.

Also, in the present specification, device information of an external device is information indicating the external device and properties of the external device. The device information may include, for example, information about an identification value of the external device, a kind of the external device, a kind and properties of sensing data sensed by the external device, and sensing period of the external device.

Also, in the present specification, a service may include all kinds of services that may be provided by using information collected by a gateway. A service may be provided via a device and/or a server that may communicate with the gateway, and may include, for example, home network service, security service, fire alarm service, power management service, and content sharing service, but the service is not limited thereto. Also, a service may be provided by the gateway.

Also, in the present specification, service information may include, for example, an identification value of the service, kinds and the number of external devices for providing the service, a priority order between the external devices for providing the service, kinds and the number of sensing data for providing the service, and a priority order of the sensing data for providing the service, but is not limited thereto.

Also, in the present specification, a data transmission rule may be a rule controlling how a gateway receives sensing data from which external device according to a resource utilization rate of the gateway. The data transmission rule may include, for example, rules about external devices that will be used to provide the service, an external device to be temporarily stopped, a method of providing the sensing data, a data transmission period of the sensing data, a data transmission amount, and whether the sensing data is scheduled to be transmitted.

Hereinafter, exemplary embodiments of the inventive concept will be described with reference to accompanying drawings.

FIG. 1 is a conceptual diagram of a service providing system according to an exemplary embodiment.

Referring to FIG. 1, the service providing system according to an exemplary embodiment may include at least one external (internet of thing (IOT)) device 1000, a gateway 2000, a device 3000, and a server 4000.

The external device 1000 may generate sensing data, and may provide the sensing data to the gateway 2000. The external device 1000 may be a general device (or object) applied to or incorporated within the device 3000 or the gateway 2000. For example, the external device 1000 may include a temperature sensor, a humidity sensor, a sound sensor, a motion sensor, a proximity sensor, a gas sensor, a heat sensor, a refrigerator, a CCTV, a TV, a washing machine, a dehumidifier, a lamp, a fire alarm, etc., but the external device 100 is not limited thereto.

The external device 1000 may pause operations thereof according to a control of the gateway 2000. In addition, the external device 1000 may process the sensing data generated in the external device 1000 and provide the sensing data to the gateway 2000 according to the control of the gateway 2000. In addition, the external device 1000 may perform various operations according to the control of the gateway 2000.

The gateway 2000 receives the sensing data from the external device 1000, and provides the sensing data to the device 3000 and/or the server 4000. Also, the gateway 2000 monitors a resource utilization rate thereof, and may control the external device 1000 for communication between the external device 1000 and the gateway 2000, when the resource utilization rate is greater than a threshold value. The gateway 2000 may pause operations of one or more external device 1000, and may request an external device 1000 to change a method of providing the sensing data.

The device 3000 and the server 4000 receive the sensing data from the gateway 2000, and may provide a user with a service by using the sensing data. The device 3000 and the server 4000 may use the sensing data transmitted from the gateway 2000 in order to provide, e.g., fire alarm service, security service, and home network service.

The device 3000 may be a smartphone, a tablet PC, a PC, a smart TV, a mobile phone, a PDA, a laptop, a media player, a micro server, a GPS, an electronic book terminal, a digital broadcasting terminal, a navigation system, a kiosk, an MP3 player, a digital camera, or other mobile or non-mobile computing device, but is not limited thereto. Also, the device 3000 may be a wearable device, such as a watch, glasses, a hair band, or a ring having a communication function and a data processing function, but the device 3000 is not limited thereto. That is, the device 3000 may include any kind of device that may receive the sensing data for providing a service from the gateway 2000 via a network.

The network may include a local area network (LAN), a wide area network (WAN), a value added network (VAN), a mobile radio communication network, a satellite communication network, and a combination thereof. The network is a data communication network in a comprehensive meaning, which allows each subject configuring the network shown in FIG. 1 communication with each other, and may include wired Internet, wireless Internet, and a mobile wireless communication network.

Figure 2:
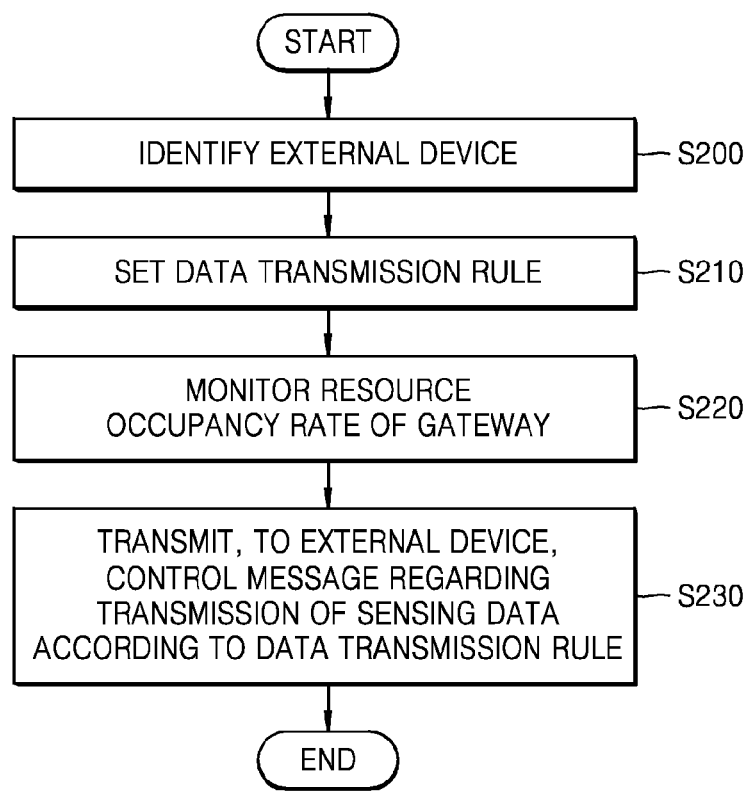
FIG. 2 is a flowchart of a method of setting a data transmission rule by a gateway and controlling an external device according to a resource utilization rate of the gateway, according to an exemplary embodiment.

FIG. 2 is a flowchart of a method of setting a data transmission rule by the gateway 2000, and controlling the external device 1000 according to the resource utilization rate of the gateway 2000.

In operation S200, the gateway 2000 may identify the external device 1000 connected to the gateway 2000. As the external device 1000 is connected to the gateway 2000, the gateway 2000 may receive device information of the external device 1000 from the external device 1000. The gateway 2000 may identify the external device 1000 based on the device information transmitted from the external device 1000. The device information of the external device 1000 is information indicating or identifying the external device 1000 and properties of the external device 1000, e.g., an identification value of the external device 1000, a kind of the external device 1000, a kind and properties of sensing data generated by the external device 1000, and sensing period of the external device 1000.

Also, the gateway 2000 may store the device information of the external device 1000. The gateway 2000 may store the device information of the external device 1000 to be linked with the service that will be provided by the device 3000 or the server 4000. In this case, the gateway 2000 receives service information from the device 3000 or the server 4000, and may identify the service to which the external device 1000 is linked based on the service information. The service information may include, e.g., an identification value of the service, a kind and the number of external device for providing the service, a priority order between external devices for providing the service, a kind and the number of pieces of the sensing data for providing the service, and priority order of the sensing data for providing the service, but the service information is not limited thereto.

In operation S210, the gateway 2000 may set a data transmission rule. The data transmission rule may be a rule controlling how the gateway 2000 will receive the sensing data from one or more external device 1000 and/or how the external device 1000 will transfer the sensing data to the gateway 2000, according to the resource utilization rate of the gateway 2000. The gateway 2000 may set the data transmission rule according to criteria that is set in advance, based on the device information of the external device 1000 and the service information of the service provided by the device 3000 or the server 4000. Otherwise, the gateway 2000 may set the data transmission rule based on a user input.

The data transmission rule may be set to be distinguished according to the resource utilization rate of the gateway 2000, and may include rules about, e.g., an external device to be used to provide the service, an external device to be paused, a data processing type of the sensing data, data transmission period of the sensing data, data transmission amount, and whether to transmit the sensing data in a scheduled transmission. For example, the gateway 2000 may set rules about the data transmission period of the sensing data, the data transmission amount, and whether to transmit the sensing data in the scheduled transmission, according to at least one selected from season, weather, and time. For example, in a dry weather, the gateway 2000 may set the transmission period of the sensing data related to the fire alarm service to be short. Also, for example, the gateway 2000 may set the transmission period of the sensing data during night time to be longer than that of during day time.

In operation S220, the gateway 2000 may monitor the resource utilization rate of the gateway 2000. The resource utilization rate of the gateway 2000 may be determined based on at least one selected from, e.g., a central processor unit (CPU) usage of the gateway 2000, memory usage, a buffer memory usage, and a communication or networking state. For example, the resource utilization rate may be determined according to how much of the CPU of the gateway 2000 is used currently (e.g., percentage of the currently used CPU with respect to a maximum performance of the CPU). Also, the resource utilization rate may be determined according to the percentage (%) of the entire capacity of the memory in the gateway 2000, which is currently being used. Also, the resource utilization rate may be determined according to how much data is currently stored in the buffer memory of the gateway 2000. However, the resource utilization rate is not limited thereto, that is, the resource utilization rate of the gateway 2000 may be determined according to various states of using the resource, as well as the CPU, the memory, and the buffer.

Also, the gateway 2000 may determine whether the resource utilization rate exceeds a critical (e.g., threshold) value that is stored in memory.

In operation S230, the gateway 2000 may transmit a control message related to the transmission of the sensing data to the external device 1000, according to the data transmission rule. The gateway 2000 identifies the data transmission rule corresponding to the current resource utilization rate of the gateway 2000, and may transmit to the external device 1000 the control message related to the transmission of the sensing data in order to control the external device 1000 according to the identified data transmission rule. The control message transmitted to the external device 1000 may include information about, for example, whether to pause or suspend the external device or transmission of sensing data, the data processing type of the sensing data, and the data transmission period.

Figure 3:
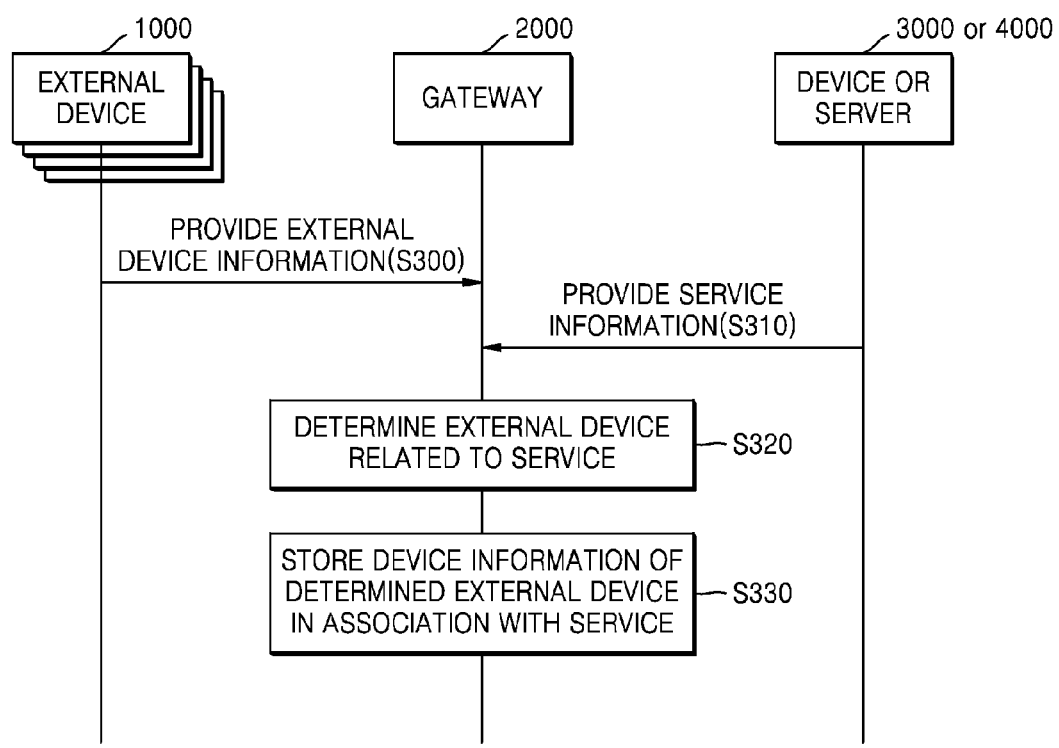
FIG. 3 is a flowchart of a method of storing device information of the external device, and service information about services of a device or a server by using the gateway, according to an exemplary embodiment.

FIG. 3 is a flowchart of a method for the gateway 2000 to store device information of the external device and service information about the service provided by the device 3000 or the server 4000, according to an exemplary embodiment.

In operation S300, the external device 1000 may provide the device information thereof to the gateway 2000. When the external device 1000 is connected to communicate with the gateway 2000, the external device 1000 may transmit the device information of the external device 1000 to the gateway 2000 in order to register the external device 1000 to the gateway 2000. The device information may include information about, for example, an identification value of the external device 1000, a kind of the external device 1000, a kind of the sensing data, properties of the sensing data, and the sensing period. Also, the gateway 2000 may identify the kind of each of the external device 1000 and the kind of the sensing data generated by the external device 1000 based on the device information.

In operation S310, the device 3000 or the server 4000 may provide the gateway 2000 with the service information. The service information is information about the service provided by the device 3000 or the server 4000, and may include an identification value of the service, kinds and the number of external devices for providing the service, a priority order between the external devices for providing the service, kinds and the number of pieces of the sensing data for providing the service, and priority order between the pieces of the sensing data for providing the service, but is not limited thereto. The service may include, for example, home network service, the security service, the fire alarm service, the power management service, and the content sharing service, but the service is not limited thereto.

In operation S320, the gateway 2000 may determine an external device related to the service. The gateway 2000 may determine the external device for providing the service based on the service information, and may determine some or all of the external devices connected to the gateway 2000 as the external devices related to the service.

In operation S330, the gateway 2000 may store the device information of the external device 1000 that is determined to be related to the service, in association with the service. For example, the gateway 2000 may add a field representing the identification value of the service to a device information table of the external device 1000, and may record the identification value of the service related to the external device 1000 in the added field. However, storage of device information is not limited thereto.

FIG. 4 is a diagram showing an example of a device information table indicating device information of the external devices 1000 according to an exemplary embodiment.

Referring to FIG. 4, the device information table according to the an exemplary embodiment may include a device identification (ID) field 40, a device kind field 42, a data type field 44, a data property field 46, and a sensing period field 48.

The identification value of the external devices 1000 may be recorded in the device ID field 40, and the kind of the external device 1000 may be recorded in the device kind field 42. For example, a temperature sensor, a sound sensor, a gas sensor, a watch, a refrigerator, a washing machine, a fire alarm, etc. may be recorded in the device kind field 42.

Also, the kind of the sensing data sensed by the external device 1000 may be recorded in the data type field 44. For example, numbers, sound, letters, images, videos, etc. may be recorded in the data type field 44.

Also, the property of the sensing data sensed by the external device 1000 may be recorded in the data property field 46. For example, a number value, a data value, a byte value, a string value, etc. may be recorded in the data property field 46.

Also, a period of sensing the sensing data by the external device 100 may be recorded in the sensing period field 48. The sensing period recorded in the sensing period field 48 may be a default value set in the external device 1000.

FIG. 5 is a diagram showing an example of a service information table indicating information about the service provided by the device 3000 or the server 4000, according to an exemplary embodiment.

Referring to FIG. 5, the service information table may include a service ID field 50, a necessary device field 52, a priority order 1 field 54, a priority order 2 field 56, and a priority order 3 field 58.

An identification value representing the service may be recorded in the service ID field 50, and information about a kind and the number of external devices 1000 that are necessary for providing the service may be recorded in the necessary device field 52. For example, "two temperature sensors", "three gas sensors", and "one fire alarm" may be recorded in the necessary device field 52.

In the priority order 1 field 54, the priority order 2 field 56, and the priority order 3 field 58, the kinds and the number of external devices 1000 corresponding to the above priority orders, from among the external devices 1000 that are necessary for providing the service, may be recorded. For example, "one temperature sensor," "one gas sensor," and "one fire alarm" may be recorded in the priority order 1 field 54, "one temperature sensor" and "one gas sensor" may be recorded in the priority order 2 field 56, and "one gas sensor" may be recorded in the priority order 3 field 58.

The information recorded in the necessary device filed 52, the priority order 1 field 54, the priority order 2 field 56, and the priority order 3 field 58 may be used to select a minimum set of external devices 1000 to sufficiently provide the service according to the resource utilization rate.

FIG. 6 is a diagram showing an example of a device information table indicating device information stored to be linked with the service, according to an exemplary embodiment.

Referring to FIG. 6, the device information table linked with the service may further include an associated service field 60, in addition to the device information table of FIG. 4.

An identification value of the service that is associated with the external device 1000 may be recorded in the associated service field 60. The gateway 2000 may compare the device information table of FIG. 4 and the service information table of FIG. 5 with each other to determine the identification value of the service that is to be recorded in the associated service field 60 of FIG. 6. For example, "home control service B" and "fire alarm service A" may be recorded in the associated service field 60, in association with a device A that is a temperature sensor.

Figure 7:
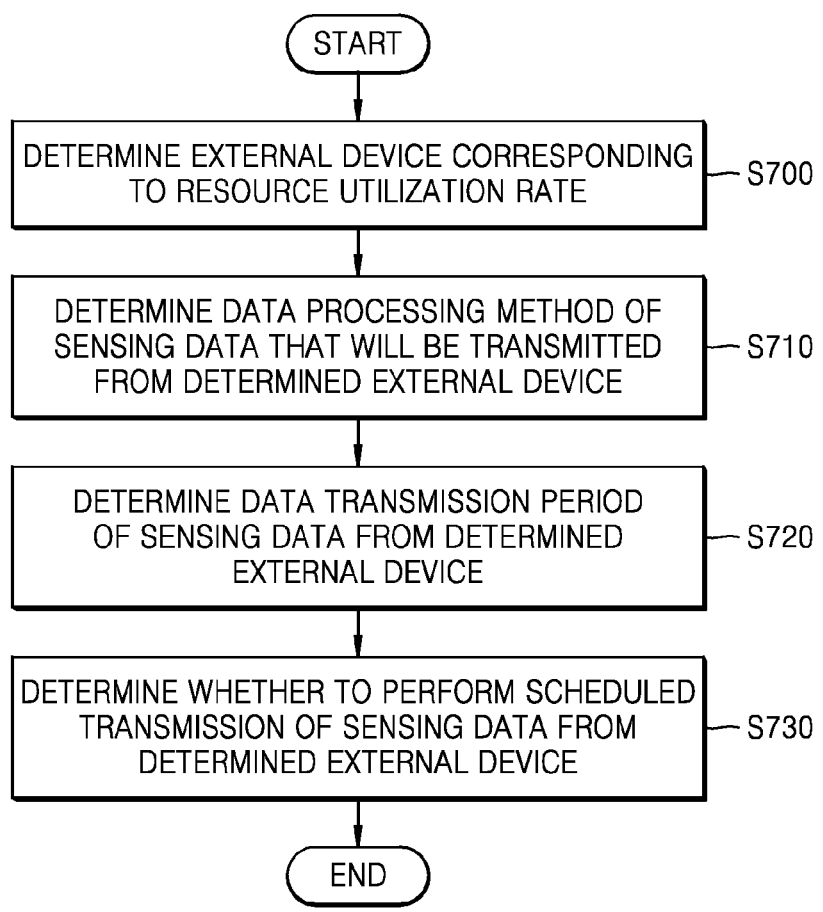
FIG. 7 is a flowchart of a method of setting data transmission rules of sensing data by using the gateway, according to an exemplary embodiment.

FIG. 7 is a flowchart of a method for the gateway 2000 to set the data transmission rule of the sensing data, according to an exemplary embodiment.

In operation S700, the gateway 2000 may determine the external device 1000 corresponding to the resource utilization rate. The gateway 2000 may determine the external device 1000 that is necessary for providing the service, according to each section of the resource utilization rate of the gateway 2000. The gateway 2000 may determine the external device 1000 corresponding to the resource utilization rate of the gateway 2000, based on the device information of the external device 1000 and the service information of the device 3000 or the server 4000. The gateway 2000 may not select the external device 1000 that is irrelevant with the service. Also, the gateway 2000 may select the external device 1000 that is essential for the service and may not select the external device that is inessential, from among the external devices 1000 necessary for providing the service.

For example, if the external devices 1000 that are necessary for providing the fire alarm service are two temperature sensors, three gas sensors, and one fire alarm, the gateway 2000 may select a temperature sensor A, a temperature sensor B, a gas sensor A, a gas sensor B, a gas sensor C, and a fire alarm A, as the external devices 1000 corresponding to the resource utilization rate ranging from 0% to 70% of the gateway 2000. Also, the gateway 2000 may select the temperature sensor A, the gas sensor A, the gas sensor B, and the fire alarm A, as the external devices 1000 corresponding to the resource utilization rate ranging from 70% to 100% in the gateway 2000.

In operation S710, the gateway 2000 may determine a data providing method of the sensing data that will be transmitted from the external devices 1000. The data providing method may include, for example, providing after collecting the sensing data, providing after dividing the sensing data, and providing after calculating an average value of the sensing data. Also, the data providing method may include a method of comparing sensing data that is newly generated with the sensing data that is previously transmitted to the gateway 2000 to only transmit changed (e.g., differential) data. The gateway 2000 may determine the data providing method of the sensing data in consideration of a real-time property of the sensing data and a size of the sensing data. The gateway 2000 may control the external device 1000 to divide the sensing data of a large capacity into pieces and the external device 1000 combines the sensing data of a small capacity. Also, when the property of the sensing data is a number value, the gateway 2000 may control the external device 1000 to transmit an average value of the sensing data.

For example, in the fire alarm service, the gateway 2000 may determine to allow the temperature sensor A, the temperature sensor B, the gas sensor A, the gas sensor B, the gas sensor C, and the fire alarm A to transmit the sensing data to the gateway 2000 without processing the sensing data, in a case that the resource utilization rate of the gateway 2000 ranges from 0% to 70%. Also, the gateway 2000 may determine to allow the temperature sensor A to transmit an average value of the sensing data, the gas sensor A to transmit divided sensing data, and the gas sensor B to transmit combined sensing data, in a case that the resource utilization rate of the gateway 2000 ranges from 70% to 100%.

In operation S720, the gateway 2000 may determine the data transmission period of the sensing data that will be transmitted from the external devices 1000. The gateway 2000 may determine the data transmission period of the sensing data in consideration of the real-time property of the sensing data, the data size, and the data providing method.

For example, in the fire alarm service, the gateway 2000 may control the temperature sensor A, the temperature sensor B, the gas sensor A, the gas sensor B, the gas sensor C, and the fire alarm A to transmit the sensing data to the gateway 2000 with a default period, when the resource utilization rate of the gateway 2000 ranges from 0% to 70%. Also, the gateway 2000 may control the temperature sensor A to transmit the average value of the sensing data once every thirty minutes and the gas sensor A to transmit the divided sensing data once every two minutes, when the resource utilization rate of the gateway 2000 ranges from 70% to 100%.

In operation S730, the gateway 2000 may determine whether the sensing data that will be transmitted from the external devices 1000 at a scheduled transmission. The gateway 2000 may determine whether the sensing data is transmitted as a scheduled transmission in consideration of the real-time property of the sensing data, the data size, and the sensing data providing method.

For example, in the fire alarm service, the gateway 2000 may determine so that the gas sensor B is scheduled to transmit the collected sensing data at a predetermined time, when the resource utilization rate of the gateway 2000 ranges from 70% to 100%.

FIG. 8 is a diagram showing an example of a table indicating the data transmission rule of the sensing data, according to an exemplary embodiment.

Referring to FIG. 8, the data transmission rule table includes a service ID field 80, a resource utilization rate field 82, an external device field 84, a pause field 86, a data providing method field 87, a transmission period field 88, and a scheduled transmission field 89.

An identification value of the service using the sensing data may be recorded in the service ID field 80, and the resource utilization rate of the gateway 2000 may be recorded in the resource utilization rate field 82. Values of periods of the resource utilization rate may be recorded in the resource utilization rate field 82.

Also, identification values of the external devices 1000 corresponding to the resource utilization rates may be recorded in the external device field 84. Also, a value indicating whether the transmission of sensing data of the external devices 1000 corresponding to the resource utilization rates is paused may be recorded in the pause field 86.

In addition, a value indicating sensing data providing method of the external device 1000 may be recorded in the data providing method field 87, e.g., "average," "separation," "combination," and "change" may be recorded in the data providing method field 87.

In addition, the transmission period of the sensing data may be recorded in the transmission period field 88, and a value indicating whether to perform scheduled transmission of the sensing data may be recorded in the scheduled transmission field 89.

FIG. 8 shows a table representing the data transmission rules about one service, but storage and configuration of data transmission rules are not limited thereto. The gateway 2000 may set a data transmission rule in a case that the sensing data collected by the gateway 2000 is used in a plurality of services. In this case, the gateway 2000 may set the data transmission rules in consideration of a real-tile property, the priority order, and the data size of the sensing data used in each of the plurality of services.

Also, FIG. 8 shows an example in which the resource utilization rate has two sections, but the configuration of the resource utilization rate is not limited thereto, and the resource utilization rate may have three or more sections.

Figure 9:
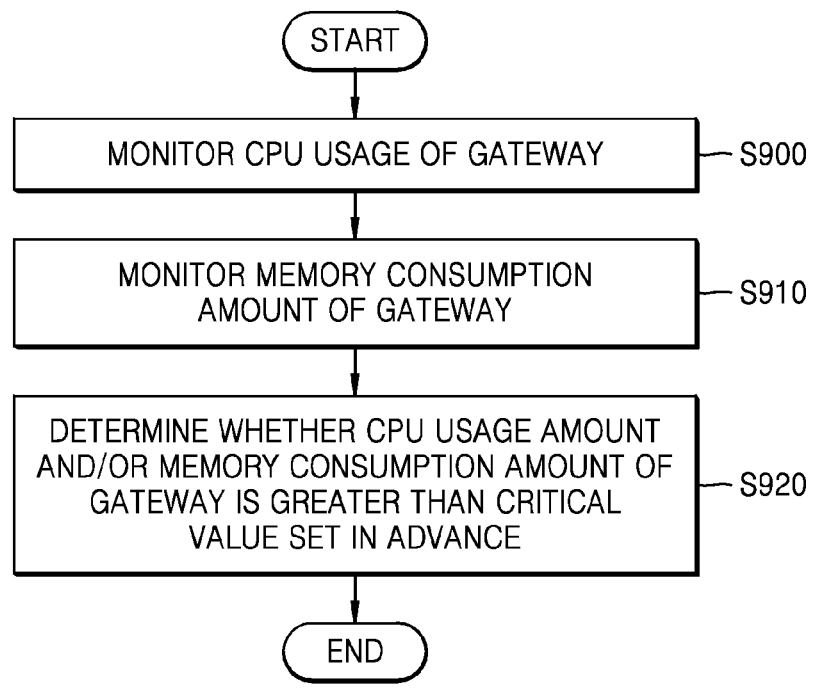
FIG. 9 is a flowchart of a method of determining whether a resource utilization rate is greater than a critical value that is set in advance by using the gateway, according to an exemplary embodiment.

FIG. 9 is a flowchart illustrating a method for the gateway 2000 to determine whether the resource utilization rate is greater than a critical value that is set in advance.

In operation S900, the gateway 2000 may monitor a CPU utilization rate in the gateway 2000, and in operation S910, the gateway 2000 may monitor memory utilization rate of the gateway 2000.

In operation S920, the gateway 2000 may determine whether the CPU utilization rate and/or the memory utilization rate exceeds the critical value that is set in advance. The gateway 2000 may determine whether the CPU utilization rate exceeds the critical value set in advance, whether the memory utilization rate exceeds the critical value set in advance, or whether the CPU utilization rate and the memory utilization rate both exceed the critical values set in advance. Also, the gateway 2000 may determine whether a value of the CPU utilization rate and the memory utilization rate exceeds the critical value set in advance. Also, the gateway 2000 may determine whether a state that the resource utilization rate exceeds the critical value is maintained for a predetermined time period.

In FIG. 9, the gateway 2000 determines the resource utilization rate based on the CPU utilization rate and/or the memory utilization rate, but the resource utilization rate is not limited thereto. For example, the gateway 2000 may determine the resource utilization rate according to states of using various resources such as a buffer memory usage amount or a communication state, as well as the CPU usage amount and the memory usage amount. Also, criteria for determining the resource utilization rates may be set variously.

Figure 10:
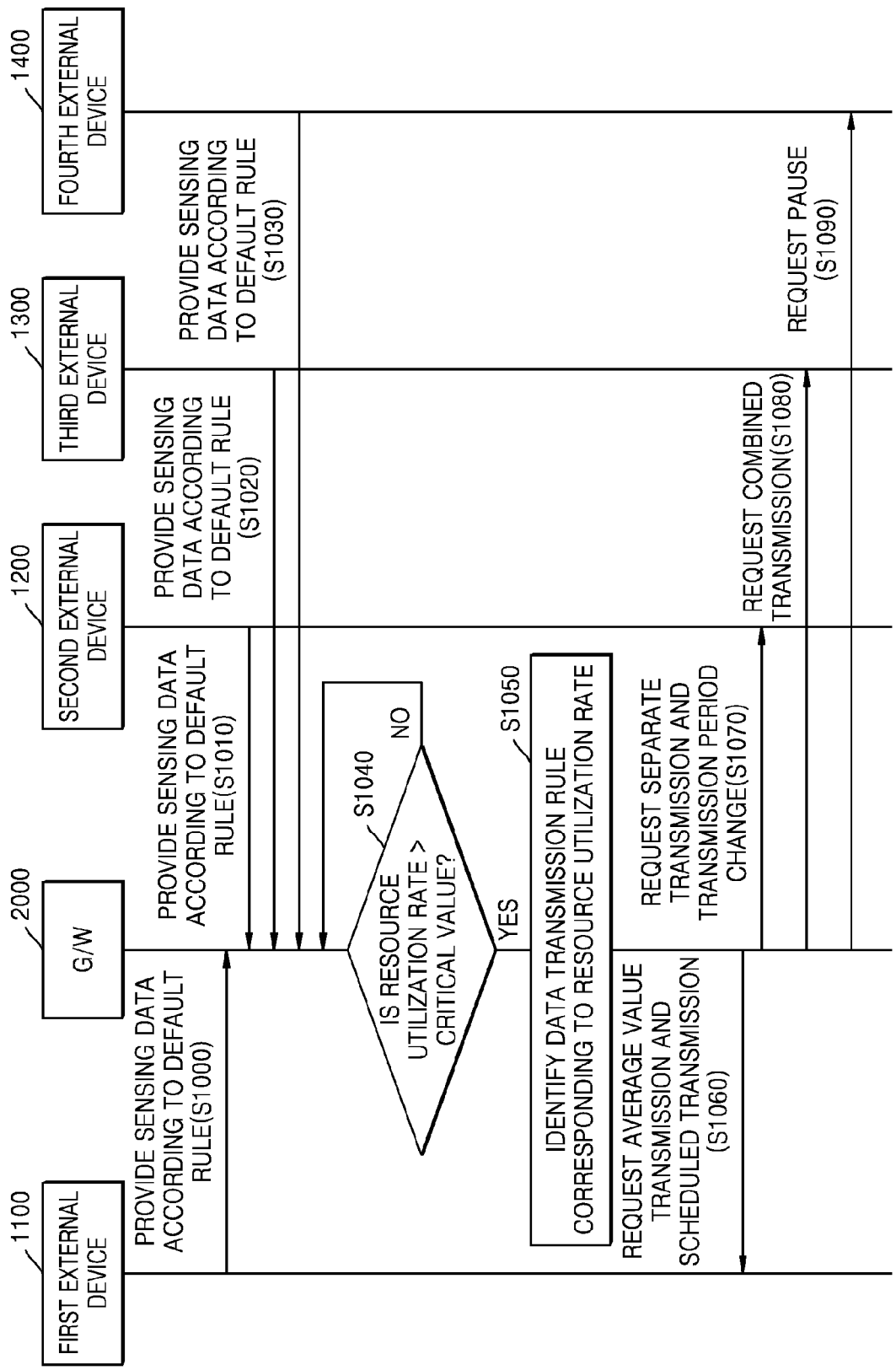
FIG. 10 is a flowchart of a method of controlling transmission of sensing data of a plurality of external devices by a gateway receiving the sensing data from the plurality of external devices, when a resource utilization rate is changed, according to an exemplary embodiment.

FIG. 10 is a flowchart of a method for the gateway 2000 receiving the sensing data from the plurality of external devices 1000 to control the transmission of the sensing data from the plurality of external devices 1000 when the resource utilization rate is changed.

In operations S1000 to S1030, a first external device 1100, a second external device 1200, a third external device 1300, and a fourth external device 1400 may provide sensing data to the gateway (G/W) 2000 according to a default rule. For example, the first to fourth external devices 1100, 1200, 1300, and 1400 may transmit the sensing data to the gateway 2000 without performing an additional process. Also, the transmission period of the sensing data provided from the first to fourth external devices 1100, 1200, 1300, and 1400 may be set as a default.

In operation S1040, the gateway 2000 may determine whether the resource utilization rate of the gateway 2000 exceeds the critical value that is set in advance. The gateway 2000 may monitor the CPU utilization rate and the memory utilization rate of the gateway 2000. Also, the gateway 2000 may determine whether the CPU utilization rate and/or the memory utilization rate of the gateway 2000 may exceed the critical value set in advance.

As a result of determination in operation S1040, if the resource utilization rate of the gateway 2000 does not exceed the critical value set in advance, the gateway 2000 may repeatedly perform operation S1040.

Also, as a result of determination in operation S1040, if the resource utilization rate of the gateway 2000 exceeds the critical value set in advance, the gateway 2000 may perform operation S1050.

In operation S1050, the gateway 2000 may identify the data transmission rule corresponding to the resource utilization rate. The gateway 2000 may identify the data transmission rule corresponding to the resource utilization rate of the gateway 2000 by using the data transmission rule table that is generated in advance.

In operations S1060 to S1090, the gateway 2000 may control the transmission of the sensing data from the first to fourth external devices 1100, 1200, 1300, and 1400 according to the identified data transmission rule.

In operation S1060, the gateway 2000 may transmit a control message to the first external device 1100 to perform scheduled transmission of an average value of the sensing data.

In operation S1070, the gateway 2000 may transmit a control message to the second external device 1200 to separately transmit the sensing data and change the transmission period.

In operation S1080, the gateway 2000 may transmit a control message to the third external device 1300 to combine and transmit the sensing data.

In addition, in operation S1090, the gateway 2000 may transmit a control message to the fourth external device 1400 to pause the transmission of the sensing data.

After that, the first, second, and third external devices 1100, 1200, and 1300 may transmit the sensing data to the gateway 2000 based on the control messages transmitted from the gateway 2000.

Also, the gateway 2000 may provide the sensing data transmitted from the first, second, and third external devices 1100, 1200, and 1300 to the device 3000 or the server 4000 so that the device 3000 or the server 4000 may provide the user with a predetermined service.

Figure 11:
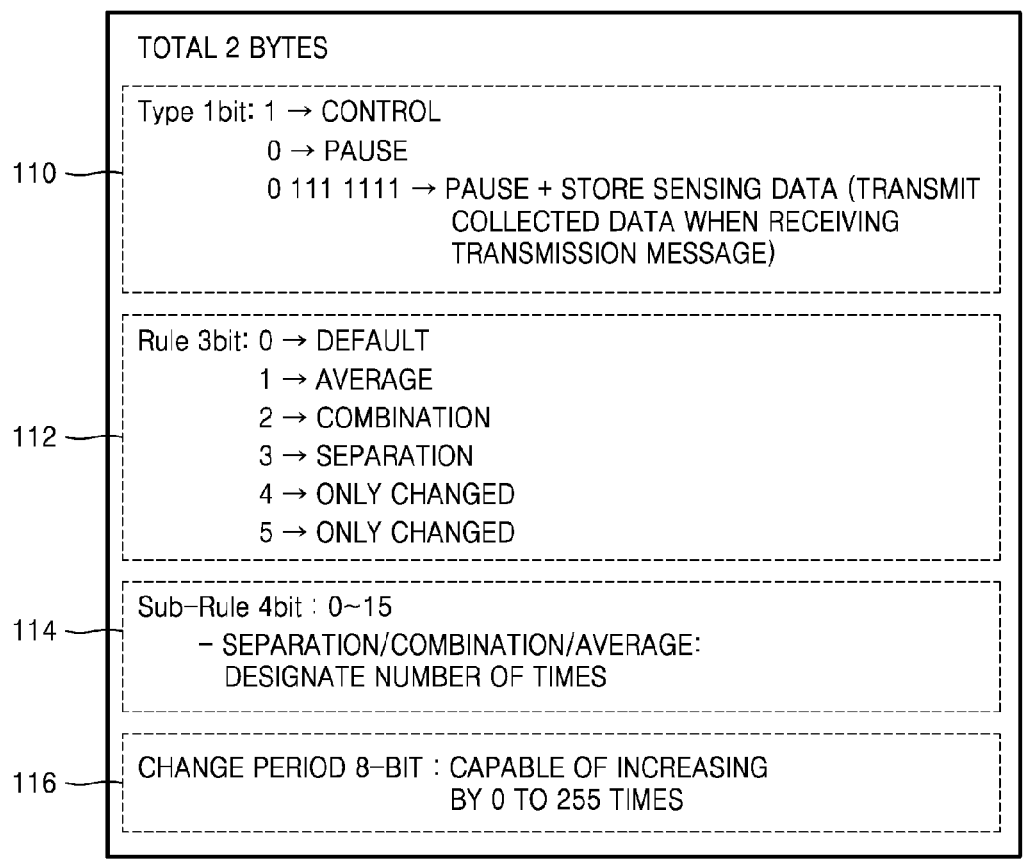
FIG. 11 is a diagram showing an example of a control message transmitted from a gateway to an external device in order to control transmission of sensing data from the external device, according to an exemplary embodiment.

FIG. 11 is a diagram showing an example of a control message transmitted from the gateway 2000 to the external device 1000 in order to control the transmission of the sensing data from the external device 1000, according to an exemplary embodiment.

Referring to FIG. 11, for example, the control message may have a size of two bytes. In this case, the control message may include a one-bit value 110 indicating a type of the control message, a three-bit value 112 indicating a data providing method, a four-bit value 114 indicating sub-rules of the data providing method, and an eight-bit value 116 for changing the transmission period of the sensing data.

The one-bit value 110 indicating the type of the control message may indicate whether the control message is a message for pausing the transmission of the sensing data from the external device 1000. For example, if the one-bit value 110 indicating the type of the control message is "1," the control message may be a message for granting the external device 1000 to transmit the sensing data and controlling the transmission of the sensing data. Also, if the one-bit value 110 indicating the type of the control message is "0," the control message may be a message for pausing the transmission of the sensing data from the external device 1000. In addition, if the one-bit value 110 indicating the type of the control message is "0" and other bits in the control message are all 1, the control message may be a message for pausing the transmission of the sensing data from the external device 1000 and accumulating and storing the sensing data sensed by the external device 1000.

The three-bit value 112 indicating the data providing method may be a value indicating how the external device 1000 processes and provides the sensing data. For example, if the three-bit value 112 indicating the data providing method is "0," the control message may be a message for controlling the external device 1000 not to additionally process the sensing data. Also, if the three-bit value 112 indicating the data providing method is "1," the control message may be a message for controlling the external device 1000 to transmit an average value of the sensing data. Also, if the three-bit value 112 indicating the data providing method is "2", the control message may be a message for controlling the external device 1000 to combine and transmit the sensing data. Also, if the three-bit value 112 indicating the data providing method is "3," the control message may be a message for controlling the external device 1000 to divide the sensing data and transmit the divided sensing data. Also, if the three-bit value 112 indicating the data providing method is "4," the control message may be a message for controlling the external device 1000 to compare newly collected sensing data with previous sensing data to transmit changed sensing data only. Also, if the three-bit value 112 indicating the data providing method is "5," the control message may be a message for controlling the external device 1000 to transmit the sensing data after combining the average values of the sensing data.

The four-bit value 114 indicating the sub-rules of the data providing method may indicate the number of times regarding the data process. For example, the four-bit value 114 indicating the sub-rules of the data providing method may indicate the number of times of dividing the sensing data, the number of times of combining the sensing data, or the number of pieces of the sensing data to be averaged.

The eight-bit value 116 for changing the transmission period of the sensing data may indicate the transmission period of the sensing data.

Figure 12:
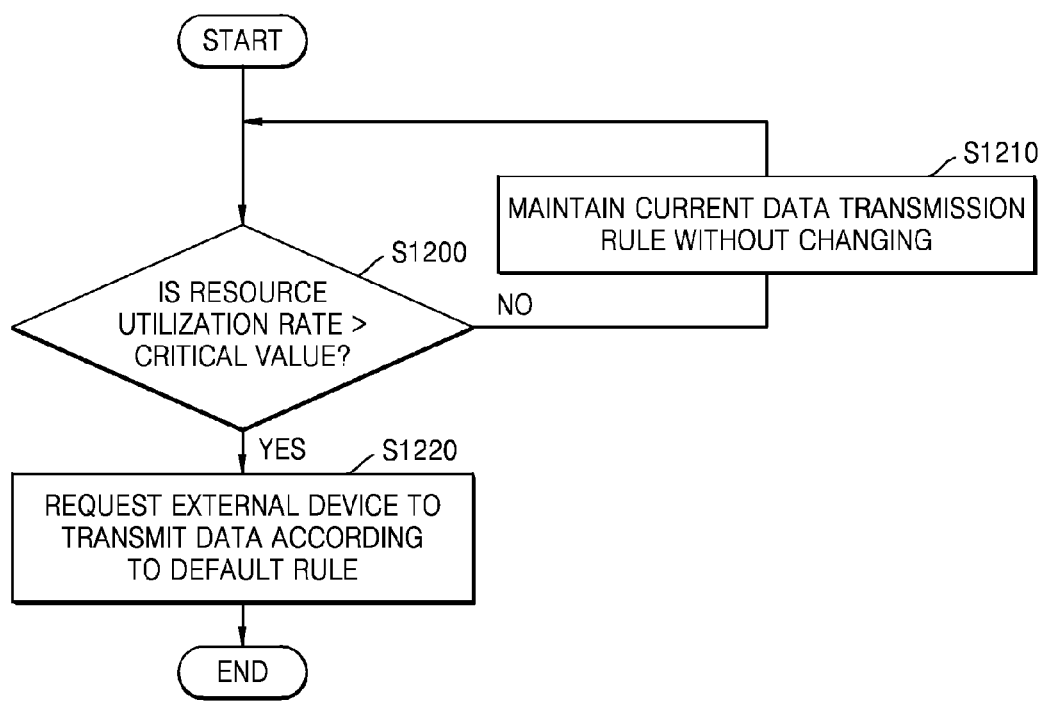
FIG. 12 is a flowchart of a method of controlling an external device by using a gateway, when a resource utilization rate is less than a critical value set in advance, according to an exemplary embodiment.

FIG. 12 is a flowchart for the gateway 2000 to control the external device 1000, when the resource utilization rate is less than the critical value set in advance, according to the an exemplary embodiment.

In operation S1200, the gateway 2000 may determine whether the resource utilization rate of the gateway 2000 is less than the critical value set in advance. When the resource utilization rate of the gateway 2000 is less than the critical value that is set in advance, the gateway 2000 may communicate with the external devices 1000 without any particular limitation. The gateway 2000 may determine whether the CPU utilization rate is less than the critical value set in advance, whether the memory utilization rate is less than the critical value set in advance, or whether both the CPU utilization rate and the memory utilization rate are less than the critical value set in advance. Also, the gateway 2000 may determine whether the average value of the CPU utilization rate and the memory utilization rate is less than the critical value that is set in advance. In addition, the gateway 2000 may determine whether a state that the resource utilization rate is less than the critical value set in advance maintains for a predetermined time period or longer.

As a result of determination in operation S1200, if the resource utilization rate is greater than the critical value that is set in advance, the gateway 2000 may not change the current data transmission rule in operation S1210. For example, the gateway 2000 may not change the data transmission rule identified in operation S1040.

As a result of determination in operation S1200, if the resource utilization rate is less than the critical value that is set in advance, the gateway 2000 may request the external device 1000 to transmit the sensing data according to the default rule in operation S1220. The gateway 2000 may transmit a control message for controlling the external device 1000 to transmit the sensing data according to the default rule to the external device 1000. The default rule is a data transmission rule in a case that the gateway 2000 may sufficiently use the resource, that is, a data transmission rule having a default value.

Figure 13:
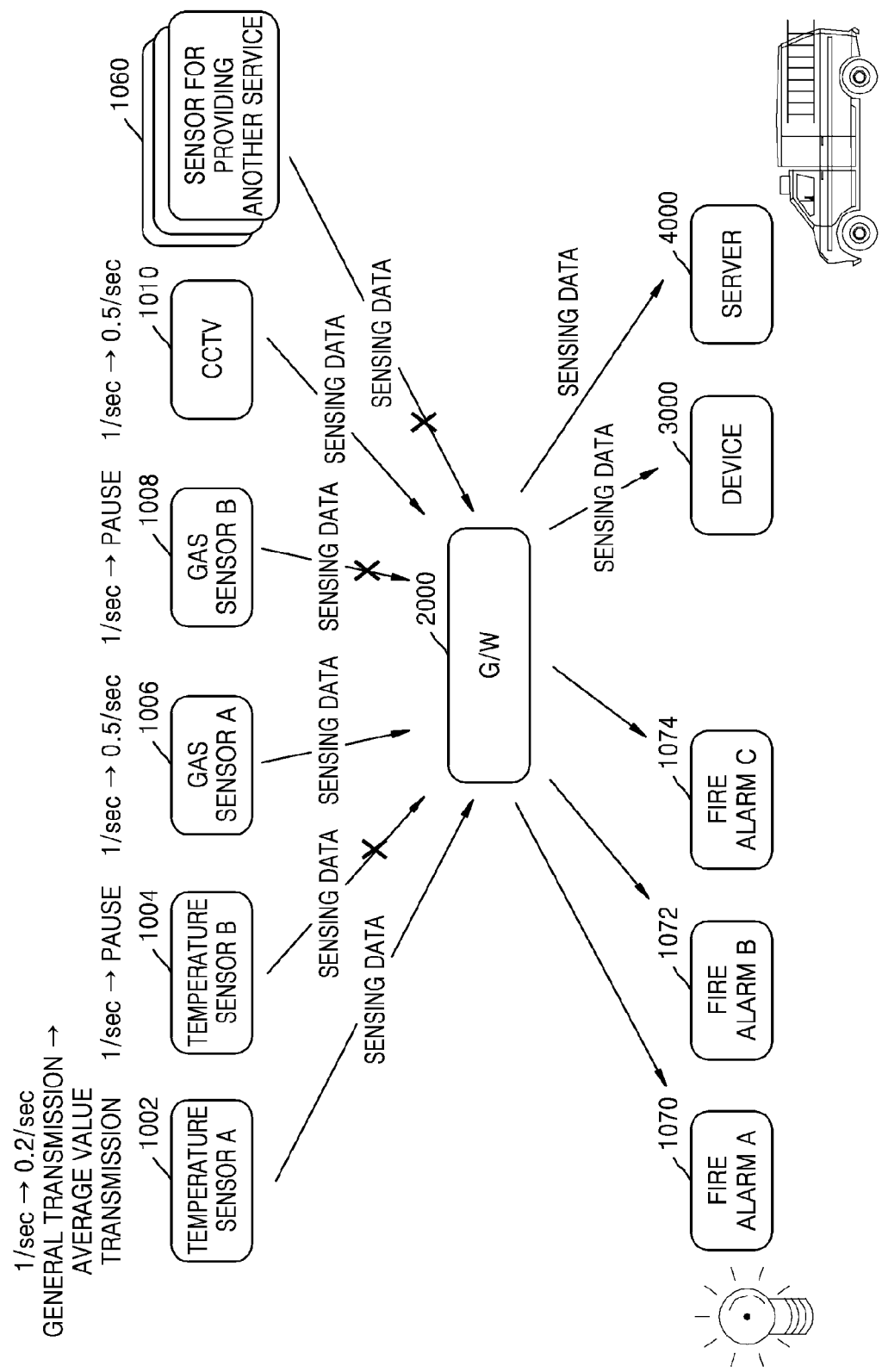
FIG. 13 is a diagram showing an example of controlling an external device by a gateway in a fire alarm service providing system, according to an exemplary embodiment.

FIG. 13 is a diagram showing an example, in which the gateway 2000 controls the external device 1000 in a fire alarm service providing system according to an exemplary embodiment.

Referring to FIG. 13, the gateway 2000 may be connected to a temperature sensor A 1002, a temperature sensor B 1004, a gas sensor A 1006, a gas sensor B 1008, a CCTV 1010, and a sensor 1060 for providing at least one another service, in order to provide the fire alarm service. In addition, the gateway 2000 may be connected to fire alarms 1070 to 1074, the device 3000, and the server 4000.

If the resource utilization rate of the gateway 2000 is low and the gateway 2000 may communicate sufficiently with the external devices 1000, the gateway 2000 may receive the sensing data from the temperature sensor A 1002, the temperature sensor B 1004, the gas sensor A 1006, the gas sensor B 1008, the CCTV 1010, and the sensor 1060 for providing another service, according to the default rules.

After that, the resource utilization rate of the gateway 2000 becomes higher and the gateway 2000 may not sufficiently communicate with the external devices 1000, the gateway 2000 may pause the transmission of the sensing data from the temperature sensor B 1004, the gas sensor B 1008, and the sensor 1060 for providing another service 1060. Also, the gateway 2000 may change the transmission periods of the sensing data and the sensing data providing methods of the temperature sensor A 1002, the gas sensor A 1006, and the CCTV 1010.

After that, if the gateway 2000 determines a gas is sensed based on the sensing data from the gas sensor A 1006, the gateway 2000 may activate both the gas sensor A 1006 and the gas sensor B 1008 and may control the gas sensor A 1006 and the gas sensor B 1008 to transmit the sensing data at shorter transmission periods.

After that, if the gateway 2000 determines that a fire has occurred, based on received data, the gateway 2000 may control the fire alarms 1070 to 1074 to operate to alarm the occurrence of the fire. Also, if the gateway 2000 determines that the fire has occurred, the gateway 2000 may stop the operations of other external devices 1000 than the external devices 1000 for notifying the outbreak of the fire. Whether there is a fire may be determined by the gateway 2000, but the determination is not limited thereto, and the device 3000 and/or the server 4000 may determine whether a fire has occurred. Also, the gateway 2000 may notify another gateway of the outbreak of the fire. In addition, the gateway 2000 notifies the device 3000 and/or the server 4000 of the fire outbreak so that the device 3000 and/or the server 4000 may operate to respond to the fire.

Figure 14:
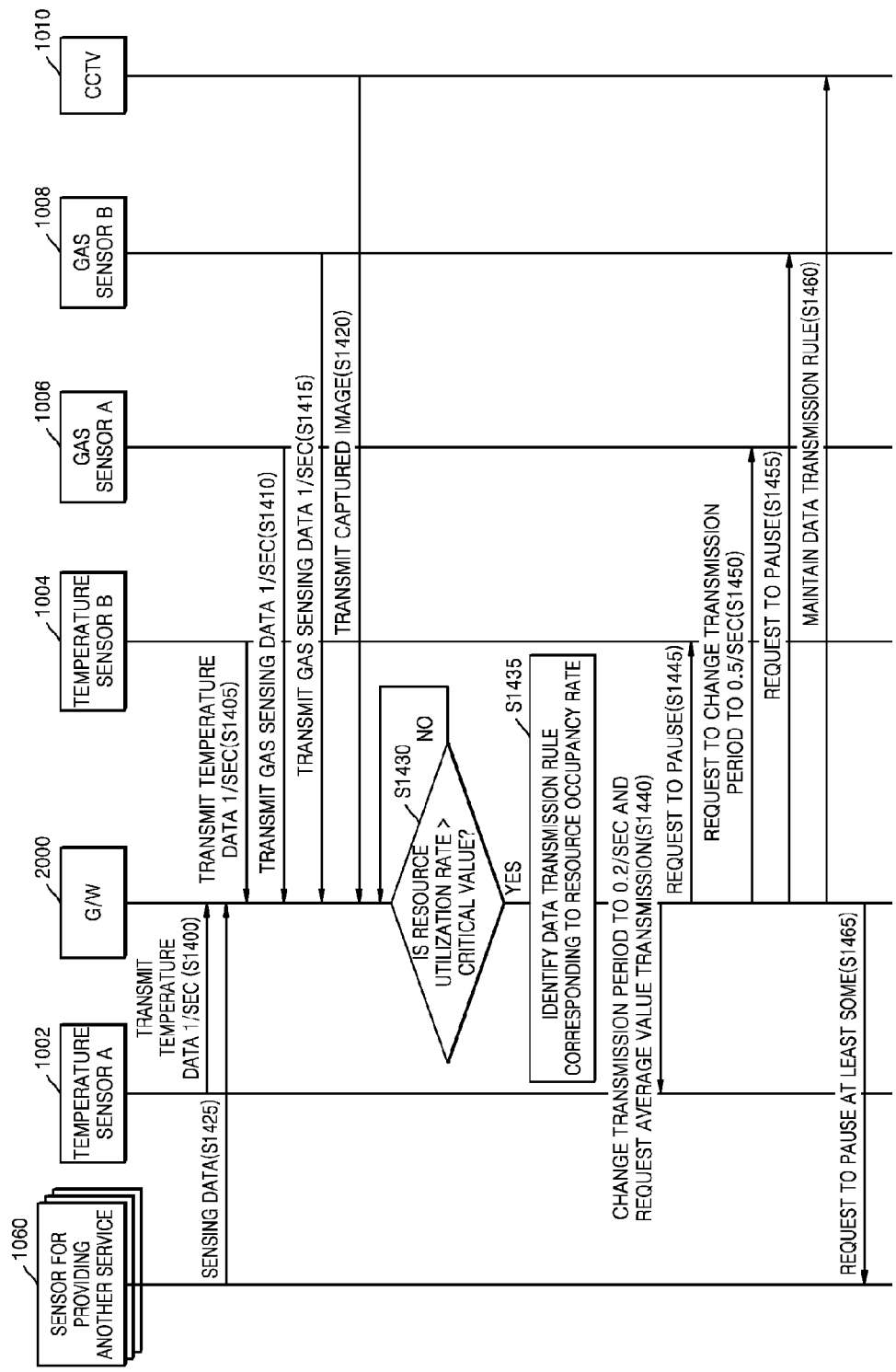
FIG. 14 is a flowchart of a method of controlling an external device by a gateway when a resource utilization rate of the gateway increases, according to an exemplary embodiment.

FIG. 14 is a flowchart of a method for the gateway 2000 to control the external device 1000 when the resource utilization rate of the gateway 2000 increases in the fire alarm service providing system according to an exemplary embodiment.

In operations S1400 to S1420, the temperature sensor A 1002, the temperature sensor B 1004, the gas sensor A 1006, the gas sensor B 1008, and the CCTV 1010 may transmit sensing data to the gateway 2000 according to the default rule.

In operation S1400, the temperature sensor A 1002 may transmit sensed temperature data to the gateway 2000 once every second (1/sec), and in operation S1405, the temperature sensor B 1004 may transmit sensed temperature data to the gateway 2000 once every second (1/sec). In addition, in operation S1410, the gas sensor A 1006 may transmit gas sensing data representing whether a gas leak is detected to the gateway 2000 once every second (1/sec), and in operation S1415, the gas sensor B 1008 may transmit gas sensing data representing whether a gas leak is detected to the gateway 2000 once every second (1/sec). In addition, in operation S1420, the CCTV 1010 may transmit captured image data to the gateway 2000, and in operation S1425, the sensor 1060 for providing another service may transmit sensing data to the gateway 2000.

In operation S1430, the gateway 2000 may determine whether the resource utilization rate of the gateway 2000 exceeds the critical value set in advance. The gateway 2000 may monitor the CPU utilization rate and the memory utilization rate of the gateway 2000. Also, the gateway 2000 may determine whether the CPU utilization rate and/or the memory utilization rate of the gateway 2000 exceeds the critical value set in advance.

As a result of determination in operation S1430, if the resource utilization rate of the gateway 2000 does not exceed the critical value that is set in advance, the gateway 2000 may repeatedly perform operation S1430.

Also, as a result of determination in operation S1430, if the resource utilization rate of the gateway 2000 exceeds the critical value that is set in advance, the gateway 2000 may perform operation S1435.

In operation S1435, the gateway 2000 may identify the data transmission rule corresponding to the resource utilization rate of the gateway 2000. The gateway 2000 may identify the data transmission rule corresponding to the resource utilization rate of the gateway 2000 by using the data transmission rule table generated in advance.

In operations S1440 to S1460, the gateway 2000 may control the temperature sensor A 1002, the temperature sensor B 1004, the gas sensor A 1006, the gas sensor B 1008, the CCTV 1010, and the sensor 1060 for providing another service according to the identified data transmission rule.

In operation S1440, the gateway 2000 may request the temperature sensor A 1002 to change the transmission period of the temperature data into 0.2/sec and to transmit an average value of the temperature data. The gateway 2000 may transmit a control message to the temperature sensor A 1002 for changing the transmission period of the temperature data into 0.2/sec and for transmitting the average value of the temperature data.

In operation S1445, the gateway 2000 may request the temperature sensor B 1004 to pause the transmission of the temperature data. The gateway 2000 may transmit a control message to the temperature sensor B 1004 for pausing the transmission of the temperature data.

In operation S1450, the gateway 2000 may request the gas sensor A 1006 to change the transmission period of the gas sensing data to 0.5/sec. The gateway 2000 may transmit a control message to the gas sensor A 1006 for changing the transmission period of the gas sensing data to 0.5/sec.

In operation S1455, the gateway 2000 may request the gas sensor B 1008 to pause the transmission of the gas sensing data. The gateway 2000 may transmit a control message to the gas sensor B 1008 for pausing the transmission of the gas sensing data.

In operation S1460, the gateway 2000 may maintain the data transmission rule of the CCTV 1010. The gateway 2000 may not transmit a control message to the CCTV 1010 so as not to change the data transmission rule of the CCTV 1010.

In operation S1465, the gateway 2000 may request at least one sensor 1060 for providing another service to pause the transmission of the sensing data.

Figure 15:
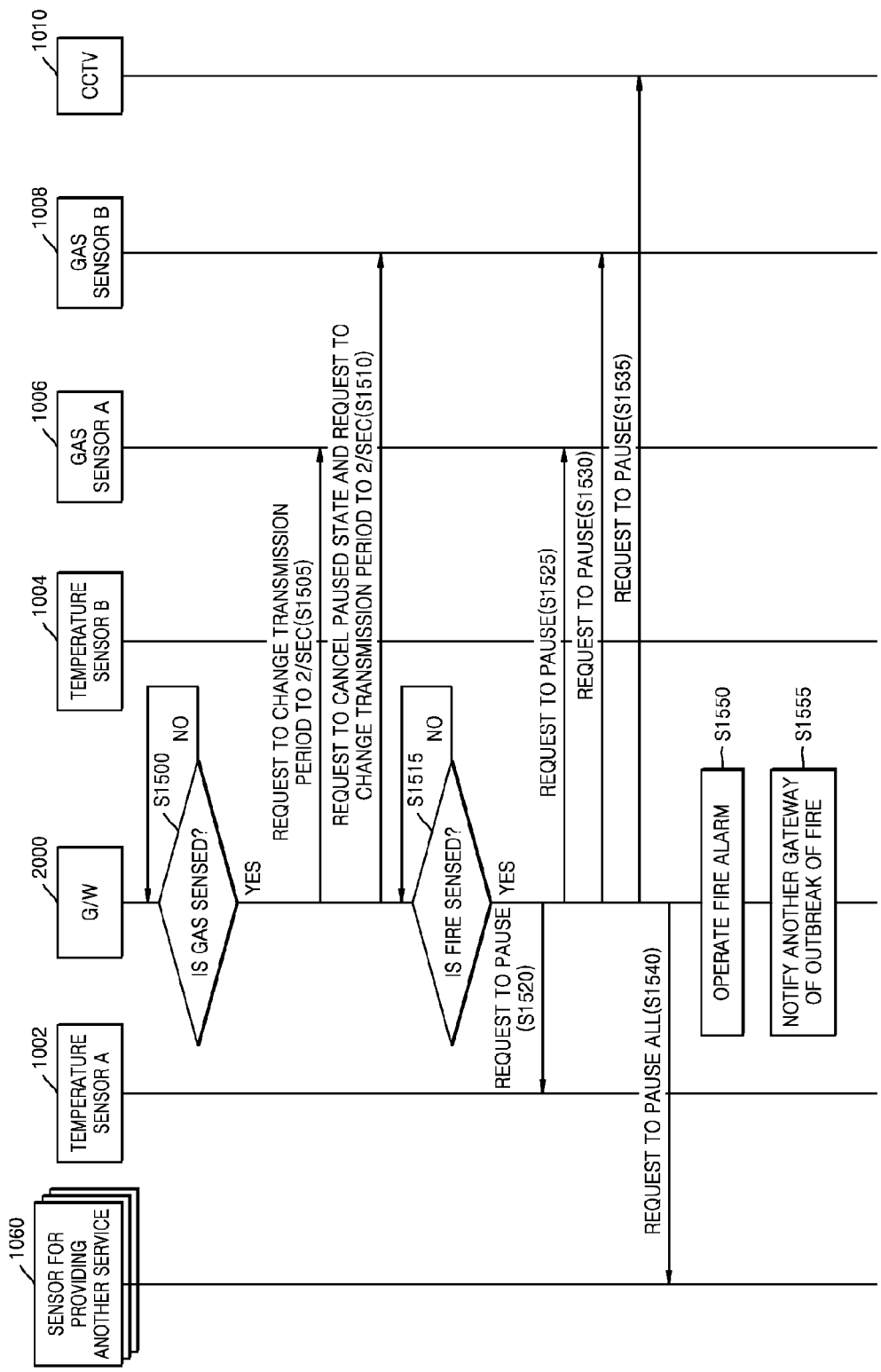
FIG. 15 is a flowchart of a method of controlling an external device by a gateway when a gas is sensed or fire has occurred, according to an exemplary embodiment.

FIG. 15 is a flowchart of a method for the gateway 2000 to control the external devices 1000 when it is determined that a gas is sensed or a fire is detected. Processes of FIG. 15 may be performed after the processes of FIG. 14, but the sequence of processes is not limited thereto.

In operation S1500, the gateway 2000 may determine whether gas is sensed. The gateway 2000 may determine whether gas is sensed based on the gas sensing data transmitted from the gas sensor A 1006.

As a result of determination in operation S1500, when it is determined that gas is not sensed, the gateway 2000 may repeatedly perform operation S1500.

Also, as a result of determination in operation S1500, when it is determined that gas is sensed, the gateway 2000 may perform operations S1505 and S1510 to more frequently receive the gas sensing data.

In operation S1505, the gateway 2000 may request the gas sensor A 1006 to change the transmission period of the gas sensing data to twice per second (2/sec). The gateway 2000 may transmit a control message to the gas sensor A 1006 for changing the transmission period of the gas sensing data to twice per second (2/sec).

In operation S1510, the gateway 2000 may request the gas sensor B 1008 to cancel the pause of the transmission of the gas sensing data and to change the transmission period of the gas sensing data to twice per second (2/sec). The gateway 2000 may transmit a control message to the gas sensor B 1008 for canceling the paused state of the transmission of the gas sensing data and changing the transmission period of the gas sensing data to twice per second (2/sec).

In operation S1515, the gateway 2000 may determine whether fire is detected. The gateway 2000 may determine whether fire is detected based on the sensing data transmitted from the temperature sensor A 1002, the gas sensor A 1006, the gas sensor B 1008, and the CCTV 1010. The gateway 2000 may determine the outbreak of the fire by itself, but the determination is not limited thereto. That is, the gateway 2000 may transmit the sensing data to the device 3000 and/or the server 4000, and may receive the information representing the determination about the outbreak of the fire that is determined by the device 3000 and/or the server 4000 from the device 3000 and/or the server 4000.

As a result of determination in operation S1515, if it is determined that there is no fire, the gateway 2000 may repeatedly perform operation S1515.

Also, as a result of determination in operation S1515, if it is determined that fire is detected, the gateway 2000 may pause the transmission of the sensing data from other external devices 1000, than the external device 100 that is used to notify the outbreak of the fire.

In operations S1520 to S1535, the gateway 2000 may pause the transmission of the sensing data from the temperature sensor A 1002, the gas sensor A 1006, the gas sensor B 1008, and the CCTV 1010. Also, in operation S1040, the gateway 2000 may request the sensors 1060 for providing another service to pause the operations of all the sensors 1060.

In operation S1550, the gateway 2000 notifies the fire alarms 1070 to 1074 of the outbreak of the fire, so that the fire alarms 1070 to 1074 may operate. In addition, in operation S1055, the gateway 2000 may notify another gateway of the outbreak of the fire. The gateway receiving the notification of the fire may operate a fire alarm that is connected to the other gateway.

Figure 16:
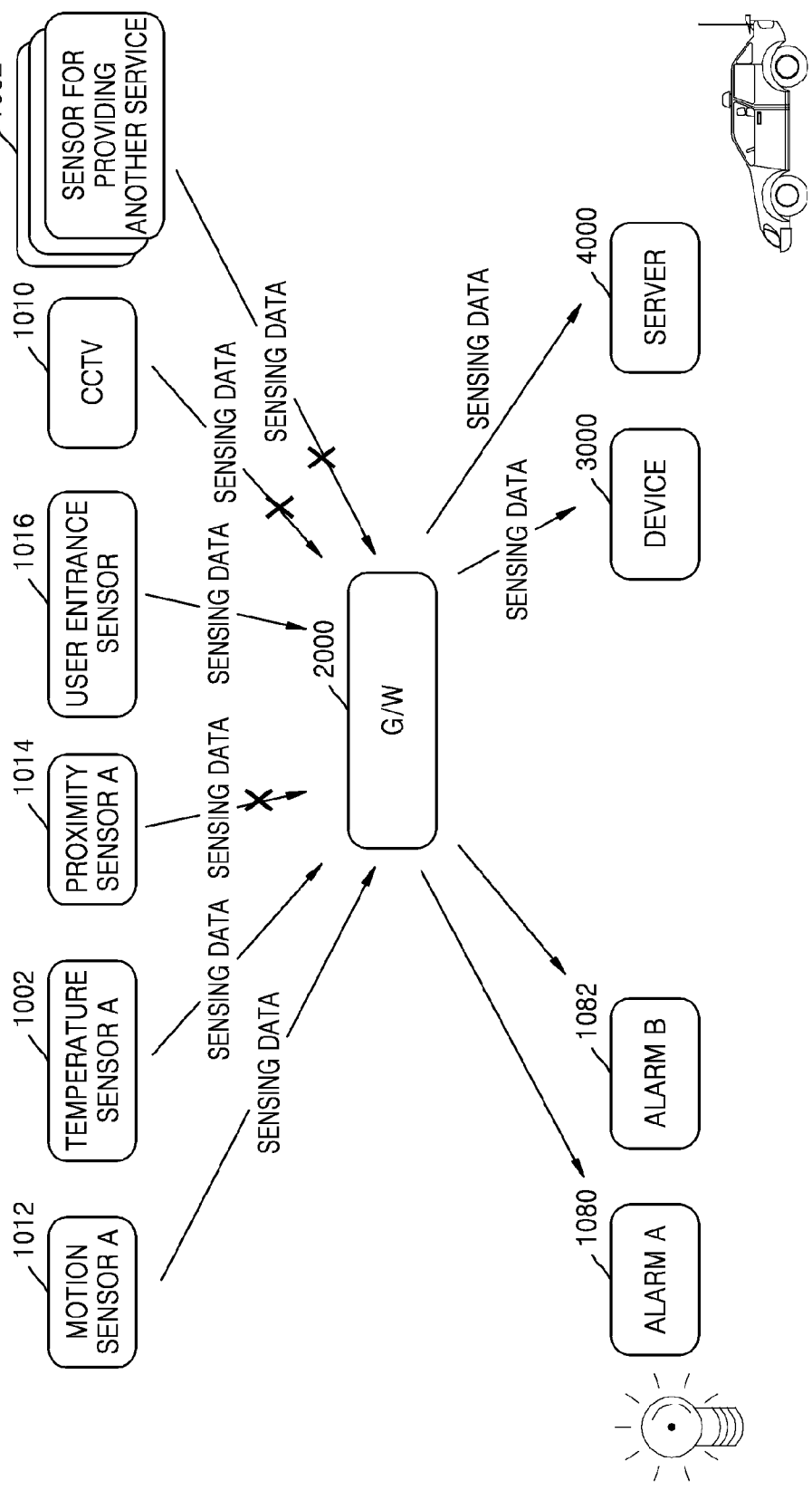
FIG. 16 is a diagram showing an example of controlling an external device by a gateway, in a security service providing system, according to an exemplary embodiment.

FIG. 16 is a diagram showing an example, in which the gateway 2000 controls some external devices 1000 in a security service providing system, according to an exemplary embodiment.

Referring to FIG. 16, the gateway 2000 may be connected to a motion sensor A 1012, the temperature sensor A 1002, a proximity sensor A 1014, a user entrance sensor 1016, the CCTV 1010, and at least one sensor 1062 for providing another service in order to provide the security service. Also, the gateway 2000 may be connected to alarms 1080 and 1082, the device 3000, and the server 4000. The motion sensor A 1012 may be a sensor for sensing motions outside the motion sensor A.

If the resource utilization rate of the gateway 2000 is low and the gateway 2000 may communicate with the external devices 1000, the gateway 2000 may receive sensing data from the motion sensor A 1012, the temperature sensor A 1002, the proximity sensor 1014, the user entrance sensor 1016, the CCTV 1010, and the sensors 1062 for providing other services according to a default rule.

If the resource utilization rate of the gateway 2000 increases and the gateway 2000 does not sufficiently communicate with the external devices 1000, the gateway 2000 may pause the transmission of the sensing data from the proximity sensor A 1014, the CCTV 1010, and the sensors 1062 for providing the other services. Also, the gateway 2000 may change the transmission periods and the data providing methods of the sensing data from the motion sensor A 1012, the temperature sensor A 1002, and the user entrance sensor 1016.

After that, if the gateway 2000 may determine that there is a trespassing of a burglar, the gateway 2000 may control all of the alarms 1080 and 1082 to operate to alarm of the trespassing. Also, when the gateway 2000 determines that there is a trespassing of a burglar, the gateway 2000 may stop the operations of the other external devices 1000 than the external device 1000 for alarming the trespassing. The gateway 2000 may determine whether trespassing is detected, but the determination is not limited thereto, and the device 3000 and/or the server 4000 may determine whether trespassing has occurred. Also, the gateway 2000 may notify another gateway of the trespassing of the burglar. Also, the gateway 2000 may notify the device 3000 and/or the server 4000 of the trespassing of the burglar, so that the device and/or the server 4000 may respond to the trespass.

Figure 17:
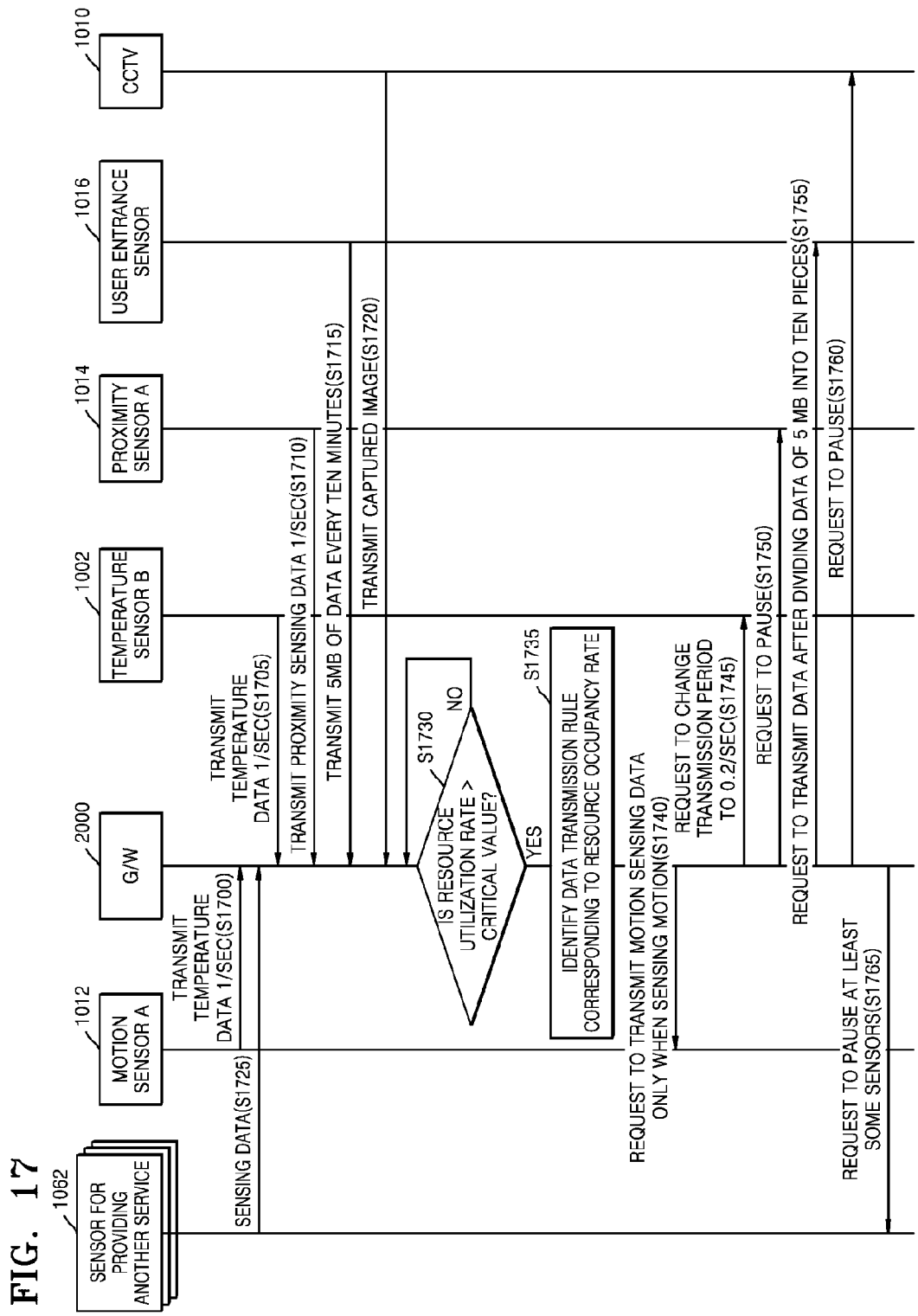
FIG. 17 is a flowchart of a method of controlling an external device by a gateway when a resource utilization rate of the gateway increases in a security service providing system, according to an exemplary embodiment.

FIG. 17 is a flowchart of a method for the gateway 2000 to control the external devices 1000 when the resource utilization rate of the gateway 2000 increases in the security service providing system according to an exemplary embodiment.

In operations S1700 to S1720, the motion sensor A 1012, the temperature sensor A 1002, the proximity sensor A 1014, the user entrance sensor 1016, and the CCTV 1010 may transmit sensing data to the gateway 2000 according to the default rule.

In operation S1700, the motion sensor A 1012 may transmit motion sensing data representing whether to sense a motion to the gateway 2000 once per second (1/sec), and in operation S1705, the temperature sensor A 1002 may transmit temperature data to the gateway 2000 once per second (1/sec). Also, in operation S1710, the proximity sensor A 1014 may transmit proximity sensing data representing whether a certain object approaches the proximity sensor A to the gateway 2000 once per second (1/sec).

In operation S1715, the user entrance sensor 1016 may transmit data about users entering a certain space (e.g., a building, a house, etc.) to the gateway 2000. The user entrance sensor 1016 may be provided on an entrance of a building or a house, and may collect information about users passing through the entrance. The user entrance sensor 1016 may transmit 5 MB of data to the gateway 2000 every ten minutes.

In operation S1720, the CCTV 1010 may transmit captured image data to the gateway 2000, and in operation S1725, the sensors 1062 for providing another service may transmit sensing data to the gateway 2000.

In operation S1730, the gateway 2000 may determine whether the resource utilization rate of the gateway 2000 exceeds a critical value that is set in advance. The gateway 2000 may monitor the CPU utilization rate and the memory utilization rate of the gateway 2000. Also, the gateway 2000 may determine whether the CPU utilization rate and/or the memory utilization rate of the gateway 2000 exceeds the critical value that is set in advance.

As a result of determination in operation S1730, if the resource utilization rate of the gateway 2000 does not exceed the critical value that is set in advance, the gateway 2000 may repeatedly perform operation S1730.

Also, as a result of determination in operation S1730, if the resource utilization rate of the gateway 2000 exceeds the critical value that is set in advance, the gateway 2000 may perform operation S1735.

In operation S1735, the gateway 2000 may identify the data transmission rule corresponding to the resource utilization rate of the gateway 2000. The gateway 2000 may identify the data transmission rule corresponding to the resource utilization rate of the gateway 2000 by using a data transmission rule table that is generated in advance.

In operations S1740 to S1760, the gateway 2000 may control the motion sensor A 1012, the temperature sensor A 1002, the proximity sensor A 1014, the user entrance sensor 1016, the CCTV 1010, and the sensors 1062 for providing another service according to the data transmission rule that is identified as above.

In operation S1740, the gateway 2000 may request the motion sensor A 1012 to transmit the motion sensing data only when motion is sensed. The gateway 2000 may transmit a control message to the motion sensor A 1012, and the control message includes information allowing the motion sensor A 1012 to transmit the motion sensing data only when motion is sensed.

In operation S1745, the gateway 2000 may request the temperature sensor A 1002 to change the transmission period of the temperature data to 0.2/sec. The gateway 2000 may transmit a control message to the temperature sensor A 1002, wherein the control message includes information for changing the transmission period of the temperature data to 0.2/sec.

In operation S1750, the gateway 2000 may request the proximity sensor A 1014 to pause the transmission of the proximity sensing data. The gateway 2000 may transmit a control message to the proximity sensor A 1014, and the control message includes information for pausing the transmission of the proximity sensing data.

In operation S1755, the gateway 2000 may request the user entrance sensor 1016 to transmit 5 MB of data about the user entrance after dividing the data into ten pieces. The gateway 2000 may transmit a control message to the user entrance sensor 1016, and the control message includes information indicating that the 5 MB of data about the user entrance has to be divided into ten pieces and the divided data is transmitted.

In operation S1760, the gateway 2000 may request the CCTV 1010 to pause the transmission of the captured image data. The gateway 2000 may transmit a control message to the CCTV 1010, and the control message includes information indicating the transmission of the captured image data is to be paused.

In operation S1765, the gateway 2000 may request at least some of the sensors 1062 for providing another service to pause the transmission of the sensing data.

After that, when it is determined that there is a trespassing of burglar, the gateway 2000 may notify the alarms 1080 and 1082 of the trespassing so that the alarms 1080 and 1082 may operate. Also, the gateway 2000 may notify another gateway of the trespassing. Also, the gateway 2000 may notify the device 3000 and/or the server 4000 of the trespassing.

Figure 18:
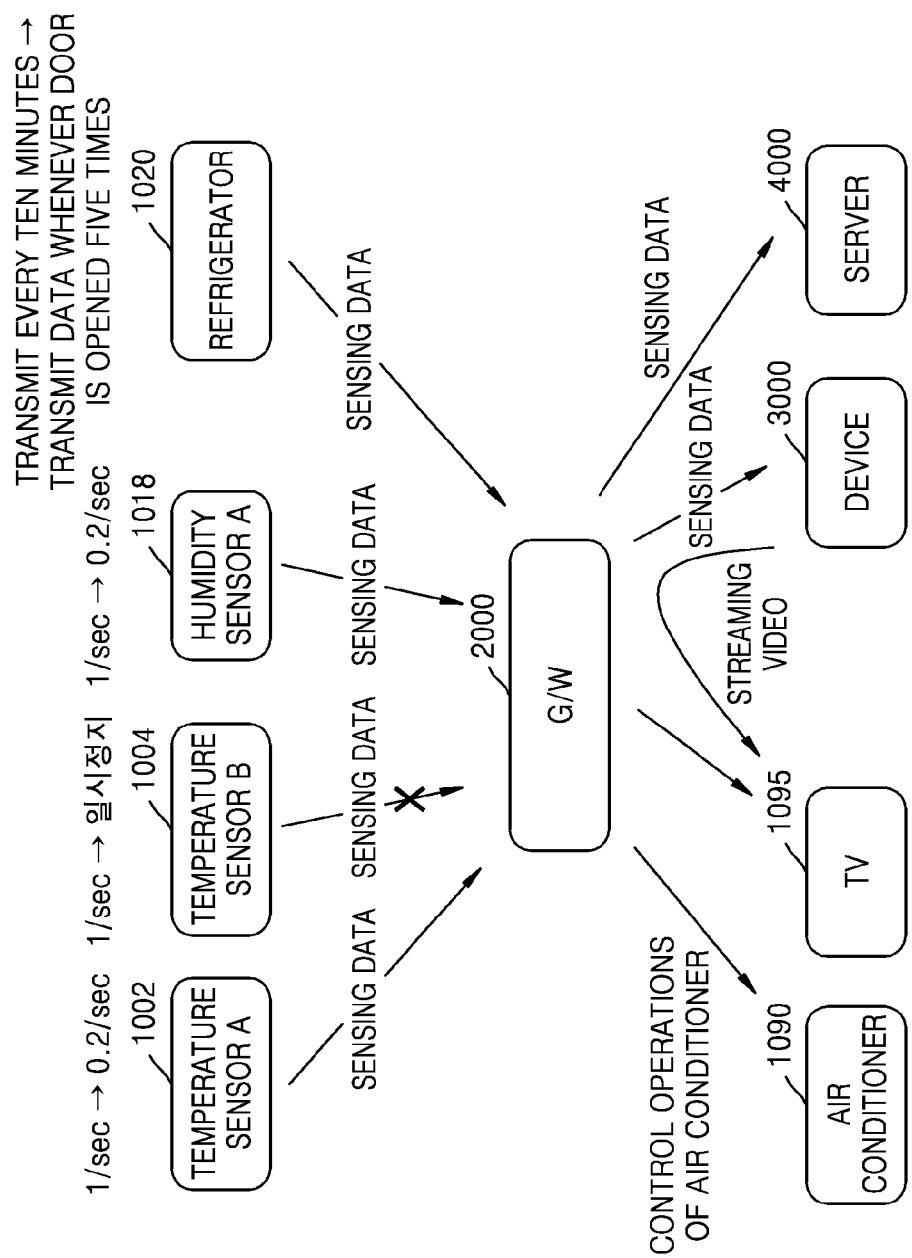
FIG. 18 is a diagram showing an example of controlling an external device by a gateway, in a home network service providing system, according to an exemplary embodiment.

FIG. 18 is a diagram showing an example, in which the gateway 2000 controls the external devices 1000 in a home network service providing system according to an exemplary embodiment.

Referring to FIG. 18, the gateway 2000 may be connected to the temperature sensor A 1002, the temperature sensor B 1004, a humidity sensor A 1018, a refrigerator 1020, an air conditioner 1090, and a TV 1095 for providing the home network service. Also, the gateway 2000 may be connected to the device 3000 and the server 4000.

When the resource utilization rate of the gateway 2000 is low and the gateway 2000 may communicate with the external devices 1000, the gateway 2000 may receive sensing data from all of the temperature sensor A 1002, the temperature sensor B 1004, the humidity sensor A 1018, the refrigerator 1020, the air conditioner 1090, and the TV 1095 according to a default transmission rule.

When the device 3000 provides the TV 1095 with a streaming video via the gateway 2000, the resource utilization rate of the gateway 2000 may increase, and accordingly, the gateway 2000 may not sufficiently communicate with the external devices 1000. In this case, the gateway 2000 may pause transmission of sensing data from the temperature sensor B 1004 that is provided near the air conditioner 1090. Also, the gateway 2000 may change transmission periods and data providing methods of the sensing data from the temperature sensor A 1002, the humidity sensor A 1018, the refrigerator 1020, the air conditioner 1090, and the TV 1095.

Also, if it is determined that a temperature in the house is higher than a critical value set in advance, the gateway 2000 may control the air conditioner 1090 to operate.

Figure 19:
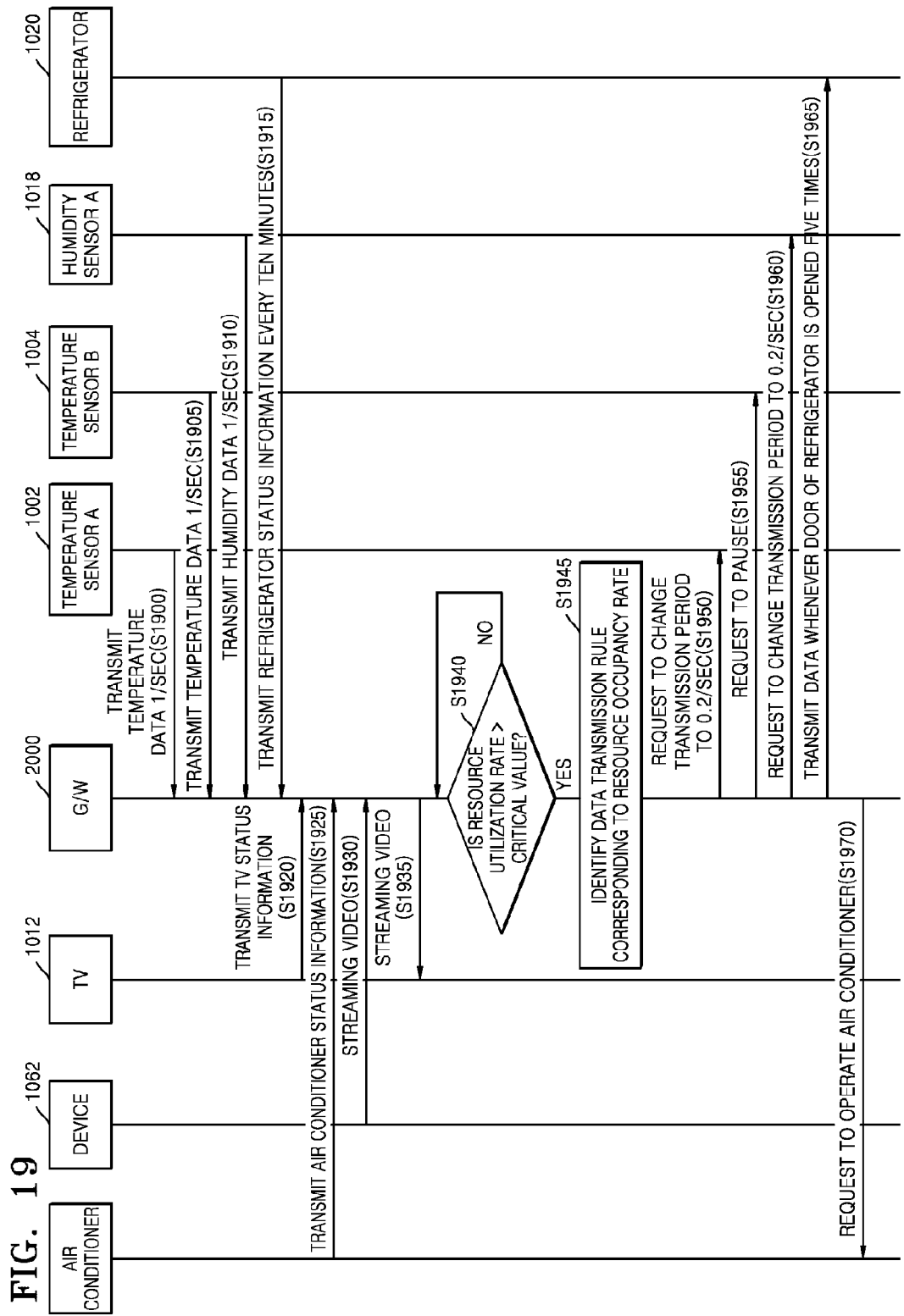
FIG. 19 is a flowchart of a method of controlling an external device by a gateway when a resource utilization rate of the gateway increases in a home network service providing system, according to an exemplary embodiment.

FIG. 19 is a flowchart of a method for the gateway 2000 to control the external devices 1000 as the resource utilization rate of the gateway 2000 increases in the home network providing system according to an exemplary embodiment.

In operations S1900 to S1925, the temperature sensor A 1002, the temperature sensor B 1004, the humidity sensor A 1018, the refrigerator 1020, the air conditioner 1090, and the TV 1095 may transmit sensing data to the gateway 2000 according to a default transmission rule.

In operation S1090, the temperature sensor A 1002 may transmit temperature data to the gateway 2000 once per second (1/sec), and in operation S1905, the temperature sensor B 1004 may transmit temperature data to the gateway 2000 once per second (1/sec). Also, in operation S1910, the humidity sensor A 1018 may transmit humidity data to the gateway 2000 once per second (1/sec). In addition, in operation S1915, the refrigerator 1020 may transmit status information thereof to the gateway 2000 once per ten seconds. In addition, in operation S1920, the TV 1095 may transmit status information thereof to the gateway 2000, and in operation S1925 may transmit status information thereof to the gateway 2000. Also, the gateway 2000 may transmit the received information to the device 3000 or the server 4000, and then, the user may monitor the states of devices in the house via the device 3000 or the server 4000.

After that, in operations S1930 and S1935, the device 3000 may transmit streaming video to the TV 1095 via the gateway 2000. Accordingly, the resource utilization rate of the gateway 2000 may be increased.

In operation S1940, the gateway 2000 may determine whether the resource utilization rate of the gateway 2000 exceeds a critical value set in advance. The gateway 2000 may monitor the CPU utilization rate and the memory utilization rate of the gateway 2000. Also, the gateway 2000 may determine whether the CPU utilization rate and/or the memory utilization rate of the gateway 2000 exceeds the critical value that is set in advance.

As a result of determination in operation S1940, if the resource utilization rate of the gateway 2000 does not exceed the critical value set in advance, the gateway 2000 may repeatedly perform operation S1930.

Also, as a result of determination in operation S1940, if the resource utilization rate of the gateway 2000 exceeds the critical value that is set in advance, the gateway 2000 may perform operation S1945.

In operation S1945, the gateway 2000 may identify the data transmission rule corresponding to the resource utilization rate of the gateway 2000. The gateway 2000 may identify the data transmission rule corresponding to the resource utilization rate of the gateway 2000 by using the data transmission table that is generated in advance. For example, the gateway 2000 may pause the transmission of the sensing data from the temperature sensor B 1004 that is installed near the air conditioner 1090. Also, the gateway 2000 may change the data providing methods or the transmission periods of the transmission data from the temperature sensor A 1002, the humidity sensor A 1018, the refrigerator 1020, the air conditioner 1090, and the TV 1095.

In operation S1950, the gateway 2000 may request the temperature sensor A 1002 to change the transmission period of the temperature data to 0.2/sec, and in operation S1955, the gateway 2000 may request the temperature B 1004 to pause the transmission of the temperature data from the temperature sensor B 1004. Also, in operation S1960, the gateway 2000 may request the humidity sensor A 1018 to change the transmission period of the humidity data to 0.2/sec, and in operation S1965, the gateway 2000 may request the refrigerator 1020 to transmit the status information of the refrigerator 1020 whenever a door of the refrigerator 1020 is opened five times.

Also, if the temperature in the house is higher than the critical value that is set in advance, the gateway 2000 may request the air conditioner 1090 to operate in operation S1970. The gateway 2000 may transmit a control message to the air conditioner 1090 for operating the air conditioner 1090.

Figure 20:
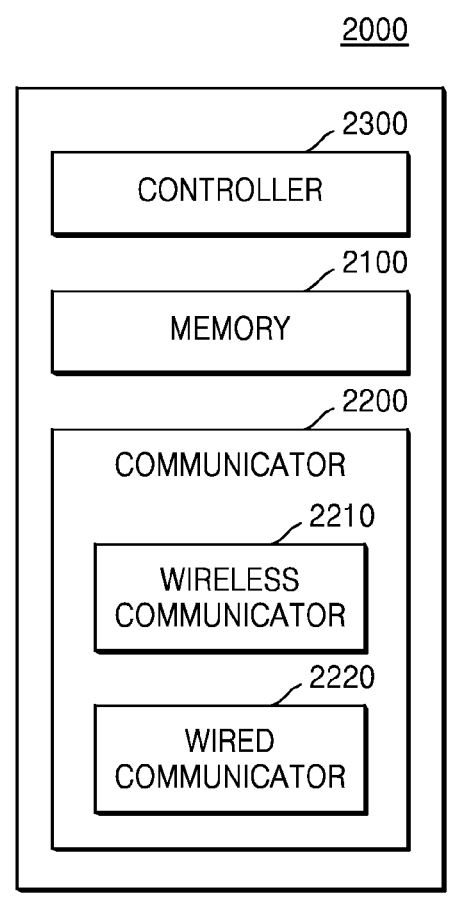
FIG. 20 is a block diagram of a gateway according to an exemplary embodiment.

FIG. 20 is a block diagram of the gateway 2000 according to an exemplary embodiment.

As shown in FIG. 20, the gateway 2000 according to an exemplary embodiment may include a memory 2100, a communicator 2200, and a controller 2300. The communicator 2200 may include a wireless communicator 2210 and a wired communicator 2220.

The memory 2100 may store device information of the external devices 1000 transmitted from the external devices 1000, and service information transmitted from the device 3000 and/or the server 4000. Also, the memory 2100 may store sensing data transmitted from the external devices 1000.

The communicator 2200 may transmit/receive data to/from the external devices 1000, the device 3000, and the server 4000. The communicator 2200 may receive the device information and the sensing data from the external devices 1000. The communicator 2200 may receive the service information from the device 3000 and the server 4000. The communicator 2200 may transmit control messages regarding the transmission of the sensing data to the external devices 1000. Also, the communicator 2200 may transmit the sensing data from the external devices 1000 to the device 3000 and the server 4000. The communicator 2200 may perform communication with other devices according to various types of communication methods. The communicator 2200 may include at least one selected from a Wi-Fi chip, a Bluetooth chip, a Zigbee communication chip, a wireless communication chip, a near field communication (NFC) chip, and Ethernet communication chip, but not limited thereto.

The controller 2300 may control overall operations of the gateway 2000. The controller 2300 may control the memory 2100 and the communicator 2200 so that the gateway 2000 may control the external devices 1000 according to the resource utilization rate of the gateway 2000. The controller 2300 may include a processor such as a central processor unit (CPU), a micro controller unit (MCU), a micro processor unit (MPU), or a ARM (Advanced RISC Machine) processor, but not limited thereto.

The controller 2300 may identify the external devices 1000 connected to the gateway 2000. Because the external devices 1000 are connected to the gateway 2000, the controller 2300 may receive the device information of the external devices 1000 from the external devices 1000. Also, the controller 2300 may identify the external devices 1000 based on the device information transmitted from the external devices 1000. The device information of the external devices 1000 is information representing properties of the external devices 1000, e.g., information about identification values of the external devices 1000, the kinds of the external devices 1000, the kinds and properties of the sensing data generated by the external devices 1000, and the sensing periods of the external devices 1000.

Also, the controller 2300 may store the device information of the external devices 1000 in the memory 2100. The controller 2300 may store the device information of the external devices 1000 in the memory 2100 in association with the services that will be provided by the device 3000 or the server 4000. In this case, the controller 2300 receives the service information from the device 3000 or the server 4000, and may identify which service is associated with the external devices 1000, based on the service information. The service information may include, e.g., an identification value of the service, the kinds and the number of external devices for providing the service, the priority order between the external devices 1000 for providing the service, the kinds and the number of pieces of the sensing data for providing the service, and the priority order of the sensing data for providing the service, but is not limited thereto.

For example, the controller 2300 adds a field representing the identification value of the service in the device information table of the external devices 1000, and may record the identification value of the service associated with the external devices 1000 in the added field, but is not limited thereto.

The controller 2300 may set the data transmission rule of the sensing data. The data transmission rule may represent rules about how to receive the sensing data from which external device 1000 according to the resource utilization rate of the gateway 2000. The controller 2300 may set the data transmission rule according to criteria set in advance, based on the device information of the external devices 1000 and the service information of the service provided by the device 3000 or the server 4000. Otherwise, the controller 2300 may set the data transmission rule based on a user input.

The data transmission rule may be set to be different according to the resource utilization rate of the gateway 2000, and may include, for example, rules about the external device 1000 to be used for providing service, the external device 1000 to be paused, a data processing type of the sensing data, the data transmission period of the sensing data, and whether to perform the scheduled transmission of the sensing data.

In detail, the controller 2300 may determine the external device 1000 corresponding to the resource utilization rate of the gateway 2000. The controller 2300 may determine the external devices 1000 that are necessary for providing services, with respect to sections of the resource utilization rate of the gateway 2000. The controller 2300 may determine the external device 1000 corresponding to the resource utilization rate of the gateway 2000 based on the device information of the external devices 1000 and the service information of the device 3000 or the server 4000. The controller 2300 may not select the external device 1000 that is irrelevant with the service. Also, the gateway 2000 may select the external device 1000 that is essential for providing the service, and may not select the external device 1000 that is inessential for providing the service, from among the external devices 1000 that are necessary for providing the service.

For example, if the external devices 1000 that are necessary for providing the fire alarm service are two temperature sensors, three gas sensors, and one fire alarm, the controller 23000 may select a temperature sensor A, a temperature sensor B, a gas sensor A, a gas sensor B, a gas sensor C, and a fire alarm A as the external devices 1000 corresponding to the resource utilization rate of the gateway 2000 ranging from 0% to 70%. Also, the controller 2300 may select the temperature sensor A, the gas sensor A, the gas sensor B, and the fire alarm A as the external devices 1000 corresponding to the resource utilization rate of the gateway 2000 ranging from 0% to 70%.

The controller 2300 may determine the data providing method of the sensing data that will be transmitted from the external devices 1000. The data providing method may include, e.g., a providing method after combining the sensing data, a providing method after dividing the sensing data, and a providing method after calculating an average value of the sensing data. Also, the data providing method may include a providing method that compares newly generated sensing data with previous sensing data transmitted to the gateway 2000 to transmit only changed data. The controller 2300 may determine the data providing method of the sensing data in consideration of the real-time property and the size of the sensing data. The controller 2300 may determine that the external device 100 has to divide the sensing data of a large capacity and the external device 1000 has to combine the sensing data of small capacities. Also, the controller 2300 may determine that the external device 1000 has to transmit an average value of the sensing data, in a case that the property of the sensing data is the number value.

For example, in the fire alarm service, the controller 2300 may determine that the temperature sensor A, the temperature sensor B, the gas sensor A, the gas sensor B, the gas sensor C, and the fire alarm A are to transmit the sensing data without performing an additional process, in a case that the resource utilization rate of the gateway 2000 ranges from 0% to 70%. Also, the controller 2300 may determine so that the temperature sensor A transmits the average value of the sensing data, the gas sensor A transmits after dividing the sensing data, and the gas sensor B transmits after combining the sensing data, in a case that the resource utilization rate of the gateway 2000 ranges from 70% to 100%.

The controller 2300 may determine the data transmission period of the sensing data that will be transmitted from the selected external devices 1000. The controller 2300 may determine the data transmission period of the sensing data in consideration of the real-time property of the sensing data, the data size, and the data providing method of the sensing data.

For example, in the fire alarm service, the controller 2300 may control so that the temperature sensor A, the temperature sensor B, the gas sensor A, the gas sensor B, the gas sensor C, and the fire alarm A may transmit the sensing data to the gateway 2000 according to the default transmission period in a case that the resource utilization rate of the gateway 2000 ranges from 0% to 70%. Also, the controller 2300 may control so that the temperature sensor A transmits the average value of the sensing data every thirty minutes and the gas sensor A transmits the divided sensing data every two minutes, in a case that the resource utilization rate of the gateway 2000 ranges from 70% to 100%.

The controller 2300 may determine a scheduled transmission of the sensing data that will be transmitted from the selected external devices 1000. The controller 2300 may determine whether to perform the scheduled transmission of the sensing data in consideration of the real-time property of the sensing data, the data size, and the data providing method of the sensing data.

For example, in the fire alarm service, the gateway 2300 may determine so that the gas sensor B is scheduled to transmit the combined sensing data at a time set in advance, in a case that the resource utilization rate of the gateway 2000 ranges from 70% to 100%.

The controller 2300 may monitor the resource utilization rate of the gateway 2000. The controller 2300 may monitor the CPU utilization rate and the memory utilization rate of the gateway 2000. Also, the controller 2300 may determine whether the resource utilization rate of the gateway 2000 exceeds a critical value that is set in advance. The controller 2300 may determine whether the CPU utilization rate exceeds the critical value set in advance, whether the memory utilization rate exceeds the critical value set in advance, and whether both the CPU utilization rate and the memory utilization rate exceed the critical value set in advance. The controller 2300 may determine whether an average value of the CPU utilization rate and the memory utilization rate exceeds the critical value set in advance. The controller 2300 may determine whether the state that the resource utilization rate exceeds the critical value set in advance maintains for a predetermined time period or longer.

The controller 2300 may transmit a control message regarding the transmission of the sensing data to the external devices 1000 according to the data transmission rule. The controller 2300 may identify the data transmission rule corresponding to the current resource utilization rate of the gateway 2000, and may transmit the control message regarding the transmission of the sensing data to the external devices 1000 in order to control the external devices 1000 according to the identified data transmission rule. The control message transmitted to the external devices 1000 may include information such as whether to pause the external device 1000, the data transmission method of the sensing data, and the data transmission period.

In addition, the controller 2300 may determine whether the resource utilization rate of the gateway 2000 is less than the critical value set in advance. If the resource utilization rate is not less than the critical value set in advance, the controller 2300 may maintain the current data transmission rule. If the resource utilization rate is less than the critical value set in advance, the controller 2300 may request the external devices 1000 to transmit the sensing data according to the default transmission rule. The controller 2300 may transmit a control message to the external devices 1000 so that the external devices 1000 may transmit the sensing data according to the default transmission rule. The default transmission rule is the data transmission rule in a case that the gateway 2000 may utilize the resource sufficiently, and may have a default value.

Further, the gateway 2000 may further include a sensing unit (not shown), an audio/video (A/V) input unit (not shown), a user input unit (not shown), and an output unit (not shown).

The user input unit may be a unit by which a user inputs data so as to control the gateway 2000. For example, the user input unit may include a key pad, a dome switch, a touch pad (a touch capacitive type touch pad, a pressure resistive type touch pad, an infrared beam sensing type touch pad, a surface acoustic wave type touch pad, an integral strain gauge type touch pad, a piezo effect type touch pad, or the like), a jog wheel, a jog switch, etc., but one or more example embodiments are not limited thereto.

The output unit may output an audio signal, a video signal, or a vibration signal and may include a display unit (not shown), a sound output unit (not shown), a vibration motor (not shown), or the like.

The display unit displays and outputs information that is processed in the gateway 2000. When the display unit and a touch pad form a mutual layer structure and then are formed as a touch screen, the display unit may be used as both an output device and input device. The display unit may include at least one of a liquid crystal display (LCD), a thin film transistor-liquid crystal display (TFT-LCD), an organic light-emitting diode (OLED) display, a flexible display, a three-dimensional (3D) display, and an electrophoretic display. Also, according to a type of the gateway 2000, the gateway 2000 may include at least two display parts. Here, the at least two display parts may be disposed to face each other by using a hinge.

The sound output unit may also output a sound signal (e.g., a call signal receiving sound, a message receiving sound, a notifying sound, or the like) related to capabilities performed by the gateway 2000. The sound output unit may include a speaker, a buzzer, or the like.

The vibration motor may output a vibration signal. For example, the vibration motor may output the vibration signal that corresponds to an output of the audio data (e.g., the call signal receiving sound, the message receiving sound, or the like) or video data. Also, when a touch is input to the touch screen, the vibration motor may output a vibration signal.

Figure 21:
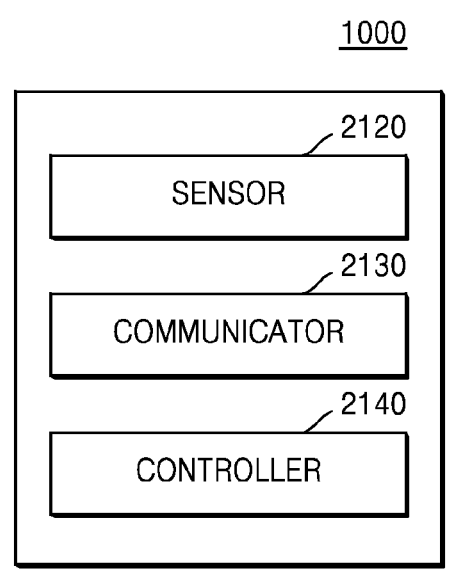
FIG. 21 is a block diagram of an external device according to an exemplary embodiment.

FIG. 21 is a block diagram of the external device 1000 according to an exemplary embodiment.

Referring to FIG. 21, the external device 1000 may include a sensor 2120, a communicator 2130, and a controller 2140. In addition, according to an exemplary embodiment, the gateway 2000 may be connected to various external devices 1000, and each of the external devices 1000 may include an additional element, in addition to the sensor 2120, the communicator 2130, and the controller 2140.

The sensor 2120 may generate sensing data. The sensor 2120 may generate the sensing data by using, for example, a temperature sensor, a humidity sensor, a sound sensor, a motion sensor, a proximity sensor, a gas sensor, or a thermal sensor. Also, the sensor 2120 is controlled by the controller 2140 that will be described later to generate the sensing data by a predetermined period.

The communicator 2130 may receive information about the transmission of the sensing data from the gateway 2000, and may transmit the sensing data to the gateway 2000.

The controller 2140 may provide the gateway 2000 with the device information of the external device 1000. The controller 2140 establishes communication with the gateway 2000 by using the communicator 2130, and may transmit the device information of the external device 1000 to the gateway 2000 in order to register the external device 1000 to the gateway 2000. The device information may include information about, for example, the identification value of the external device 1000, the kind of the external device 1000, the kind of the sensing data, the property of the sensing data, and the sensing period.

First, the controller 2140 may provide the sensing data to the gateway 2000 according to the default transmission rule. For example, the controller 1300 may transmit the sensing data to the gateway 2000 without performing an additional process. In this case, the transmission period of the sensing data provided from the controller 2140 may have a default value.

After that, if the resource utilization rate of the gateway 2000 exceeds the critical value set in advance, the controller 2140 may receive information about the data transmission rule corresponding to the resource utilization rate from the gateway 2000. The data transmission rule may be a rule about how the gateway 2000 would receive the sensing data from which external device 1000 according to the resource utilization rate of the gateway 2000. The data transmission rule may include rules about, for example, the external device 1000 to be used to provide the service, the external device 1000 to be paused, the data providing method of the sensing data, the data transmission period of the sensing data, the data transmission amount, and the scheduled transmission of the sensing data.

Also, the controller 2140 may provide the sensing data to the gateway 2000 according to the data transmission rules. For example, the controller 2140 may be scheduled to transmit the average value of the sensing data to the gateway 2000 at a predetermined time. Also, for example, the controller 2140 may transmit the sensing data after dividing the sensing data to the gateway 2000, and may change the data transmission period. In addition, the controller 2140 may combine the sensing data and transmit the combined sensing data to the gateway 2000. Also, the controller 2140 may pause the transmission of the sensing data.

After that, when the resource utilization rate of the gateway 2000 reduces to the critical value set in advance or lower, the controller 2140 may transmit the sensing data to the gateway 2000 according to the default transmission rule.

The gateway 2000 may control at least one external device 1000, and may include a communicator receiving the sensing data from the external device 1000 and a controller determining the processing period of the sensing data based on at least one selected from the resource utilization rate of the gateway 2000 used to process the sensing data, the status information of the external device 1000, and the number of external device 1000.

Further, the external device 1000 may further include a user input unit (not shown), an output unit (not shown), and a memory (not shown), but not limited thereto.

Figure 22:
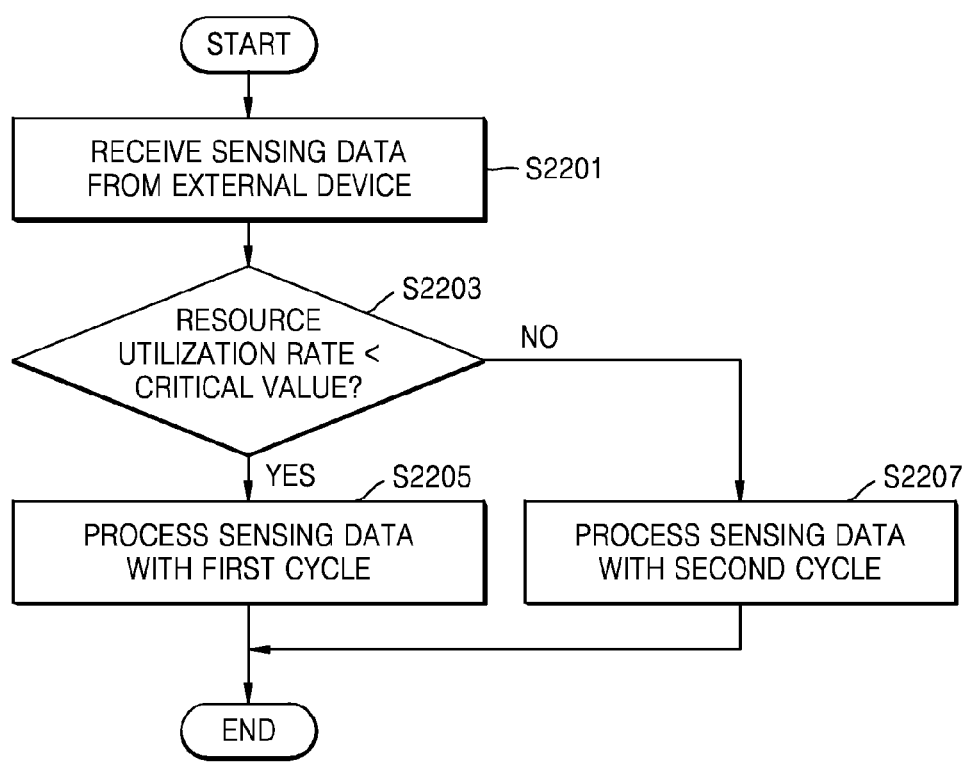
FIG. 22 is a flowchart of a method of changing a period of processing sensing data transmitted from a plurality of external devices according to a change in a resource utilization rate by using a gateway that receives the sensing data from the plurality of external devices, according to an exemplary embodiment.

FIG. 22 is a flowchart of a method for the gateway 2000 receiving the sensing data from the plurality of external devices 1000 to change a processing period of the sensing data transmitted from the plurality of external devices 1000 when the resource utilization rate of the gateway 2000 is changed, according to an exemplary embodiment.

Referring to FIG. 22, the external devices 1000 may transmit sensing data to the gateway 2000. The gateway 2000 may receive the sensing data from the external devices 1000 (operation S2201). The gateway 2000 determines whether the resource utilization rate of the gateway 2000 is less than the critical value (operation S2203), and if the resource utilization rate of the gateway 2000 is less than the critical value, the sensing data is processed with a first cycle (S2205), and if the resource utilization rate is greater than the critical value, the sensing data is processed with a second cycle (S2207). That is, the gateway 2000 may change the period of processing the sensing data based on the resource utilization rate of the gateway 2000.

For example, a temperature sensor that is the external device 1000 may be connected to the gateway 2000, and the temperature sensor transmits sensed temperature data to the gateway 2000 every one second. The gateway 2000 may process the temperature data with one second cycle in a state that the resource utilization rate of the gateway 2000 is equal to or less than 70% that is a critical value. If the resource utilization rate is 90% that is greater than the critical value, the gateway 2000 may change the processing period for processing the temperature data every two seconds.

The gateway 2000 may request the temperature sensor to change the data transmission period, when the resource utilization rate of the gateway 2000 is greater than the critical value. For example, when the resource utilization rate of the gateway 2000 is equal to or less than 70% that is the critical value, the gateway 2000 may request the temperature sensor to transmit the temperature data to the gateway 2000 once every second. In addition, for example, if the resource utilization rate of the gateway 2000 is 90% that is greater than the critical value, the gateway 2000 may request the temperature sensor to transmit the temperature data to the gateway 2000 once every two seconds.

In addition, if the resource utilization rate of the gateway 2000 is greater than the critical value, the gateway 2000 may only receive the temperature data from the temperature sensor once every second, but does not process the temperature data.

Also, the gateway 2000 may determine a period of receiving the sensing data from the external devices 1000 based on the resource utilization rate of the gateway 2000. The gateway 2000 may receive the sensing data from the external device 1000 with a first cycle if the resource utilization rate is less than the critical value, and the gateway 2000 may receive the sensing data from the external device 1000 with a second cycle if the resource utilization rate is greater than the critical value. For example, the gateway 2000 may receive the sensing data from the external device 1000 once every second when the resource utilization rate of the gateway 2000 is equal to or less than 70% that is the critical value, and may receive the sensing data from the external device 1000 once every two seconds when the resource utilization rate of the gateway 2000 is 90% that is greater than the critical value.

Figure 23:
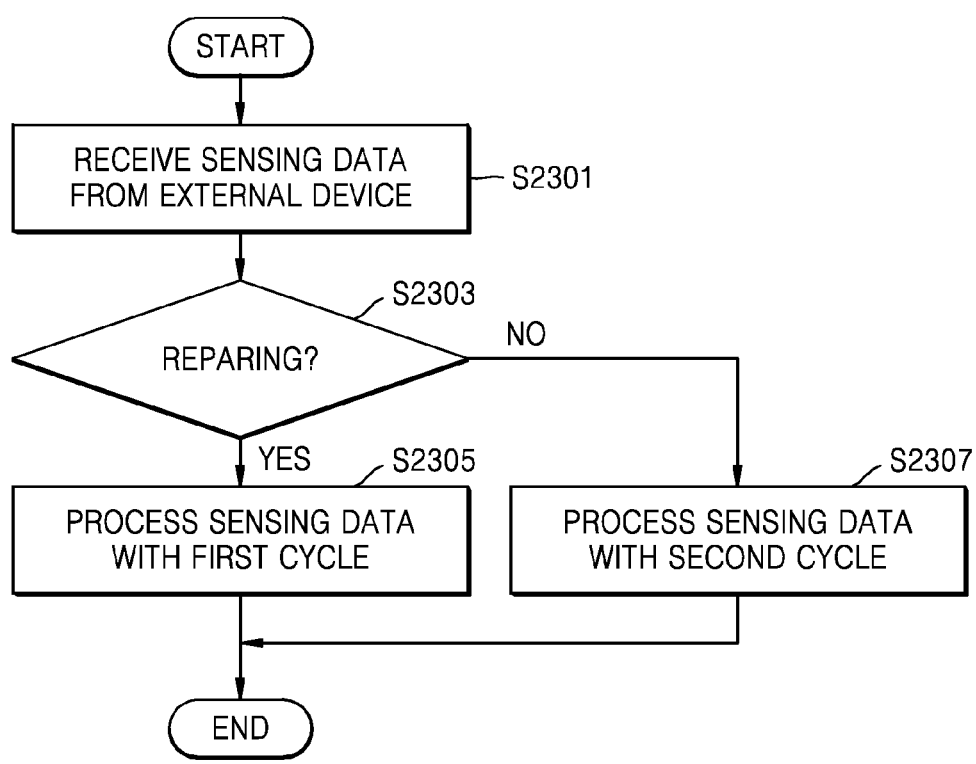
FIG. 23 is a flowchart of a method of changing a period of processing sensing data transmitted from a plurality of external devices, when a gateway receiving the sensing data from the plurality of external devices is updating software, according to an exemplary embodiment.

FIG. 23 is a flowchart of a method of changing the period of processing the sensing data transmitted from the plurality of external devices 1000, in a case that the gateway 2000 receiving the sensing data from the plurality of external devices 1000 is being repaired, according to an exemplary embodiment.

A case that the gateway 2000 is being repaired may include a case that the gateway 2000 changes or updates software related to operations of the gateway 2000. For example, the case that the gateway 2000 is being repaired may include a case that driver software of the gateway 2000 is updated, a case that application software installed on the gateway 2000 is updated, and a case that an operating system installed on the gateway 2000 is updated, but is not limited thereto.

Referring to FIG. 23, the external devices 1000 may transmit sensing data to the gateway 2000. The gateway 2000 may receive the sensing data from the external devices 1000 (S2301). The gateway 2000 determines whether the gateway 2000 is being repaired (S2303). If the gateway 2000 is being repaired, the gateway 2000 processes the sensing data with the first cycle (S2305), and if the gateway 2000 is not being repaired, the gateway 2000 may process the sensing data with the second cycle (S2307). That is, the gateway 2000 may change the period of processing the sensing data based on whether the gateway 2000 is being repaired.

For example, a temperature sensor that is the external device 1000 may be connected to the gateway 2000 and the temperature sensor may transmit temperature data to the gateway 2000 once every second. The gateway 2000 may process the temperature data once every second when the software is not being updated. The gateway 2000 may process the temperature data once every two seconds after changing the processing period, when the software is being updated.

The gateway 2000 may request the temperature sensor to change the data transmission period, when the software is being updated. For example, during the gateway 2000 is not updating the software, the gateway 2000 may control the temperature sensor to transmit the temperature data to the gateway 2000 once every second. During the gateway 2000 is updating the software, the gateway 2000 may request the temperature sensor to transmit the temperature data once every two seconds.

Also, during the software update, the gateway 2000 may only receive the temperature data transmitted from the temperature sensor once every second, but may not process the temperature data.

Figure 24:
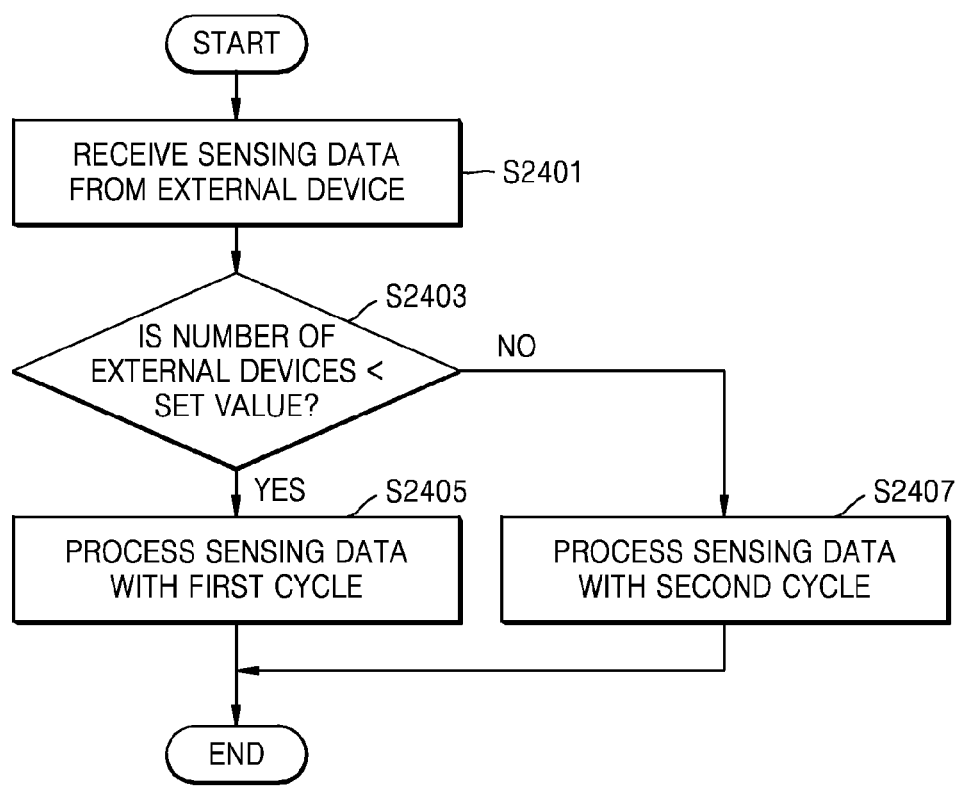
FIG. 24 is a flowchart of a method of changing a period of processing sensing data transmitted from a plurality of external devices according to the number of external devices, by using a gateway that receives the sensing data from the plurality of external devices, according to an exemplary embodiment.

FIG. 24 is a flowchart of a method for the gateway 2000 receiving the sensing data from the plurality of external devices 1000 to change the period of processing the sensing data transmitted from the plurality of external devices 1000 according to the number of external devices 1000, according to an exemplary embodiment.

Referring to FIG. 24, the external devices 1000 may transmit sensing data to the gateway 2000. The gateway 2000 may receive the sensing data from the external devices 1000 (S2401). The gateway 2000 determines whether the number of external devices 1000 is less than a set value (S2403). If the number of external devices 1000 is less than the set value, the gateway 2000 processes the sensing data with the first cycle (S2405), and if the number of external devices 1000 is greater than the set value, the gateway 2000 may process the sensing data with the second cycle (S2407). That is, the gateway 2000 may change the period of processing the sensing data based on the number of external devices 1000.

For example, if the set value is 10 and ten or less external devices 1000 are connected to the gateway 2000, the gateway 2000 may process the sensing data transmitted from the external devices 1000 once every second. If fifteen external devices 1000 are connected to the gateway 2000, the gateway 2000 may process the sensing data transmitted from the external devices 1000 once every two seconds.

Also, if the external devices 1000, the number of which is greater than the set value, are connected to the gateway 2000, the gateway 2000 may request the external devices 1000 to change the data transmission period. For example, if seven external devices 1000, that is, less than the set value, are connected to the gateway 2000, the gateway 2000 may request the external devices 1000 to transmit the sensing data to the gateway 2000 once every second. If fifteen external devices 1000, that is, greater than the set value, are connected to the gateway 2000, the gateway 2000 may request the temperature sensor to transmit the sensing data to the gateway 2000 once every two seconds.

Also, if fifteen external devices 1000, the number of which is greater than the set value, are connected to the gateway 2000, the gateway 2000 may only receive the sensing data once every second, but may not process the sensing data.

Also, the gateway 2000 may determine the period of receiving the sensing data from the external devices 1000 based on the number of external devices 1000. When seven external devices 1000 are connected to the gateway 2000, the gateway 2000 may receive the sensing data from the external devices 1000 with a first cycle, and when fifteen external devices 1000 are connected to the gateway 2000, the gateway 2000 may receive the sensing data from the external devices 1000 with a second cycle. For example, when the number of external devices 1000 connected to the gateway 2000 is seven, the gateway 2000 may receive the sensing data from the external devices 1000 once every second, and when the number of external devices 1000 connected to the gateway 2000 is fifteen, the gateway 2000 may receive the sensing data from the external devices 1000 once every two seconds.

Figure 25:
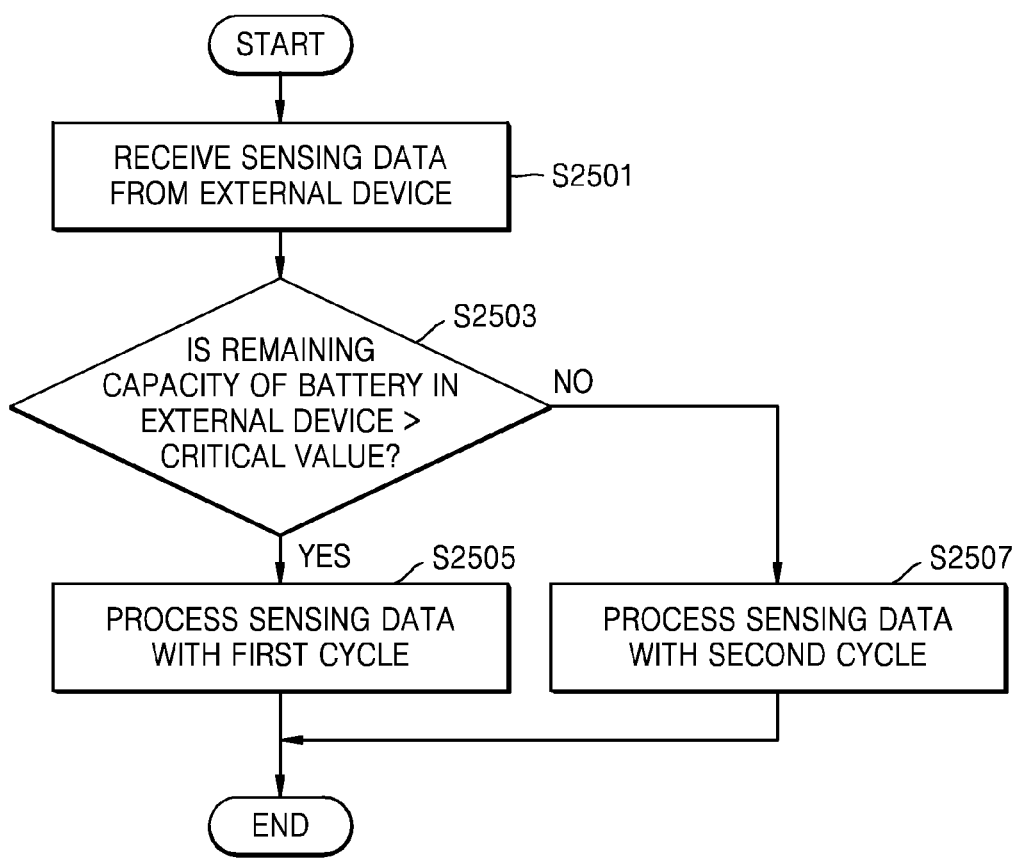
FIG. 25 is a flowchart of a method of changing a period of processing sensing data transmitted from a plurality of external devices according to states of the external devices, e.g., remaining amounts of batteries, by a gateway that receives the sensing data from the plurality of external devices, according to an exemplary embodiment.

FIG. 25 is a flowchart of a method for the gateway 2000 receiving the sensing data from the plurality of external devices 1000 to change the period of processing the sensing data from the plurality of external devices according to states of the external devices 1000, for example, a remaining capacity in a battery, according to an exemplary embodiment.

Referring to FIG. 25, the external devices 1000 may transmit sensing data to the gateway 2000. The gateway 2000 may receive the sensing data from the external devices 1000 (S2501). The gateway 2000 determines whether a remaining capacity of the battery in each of the external devices 1000 is greater than a critical value (S2503). In addition, if the remaining capacity of the battery in each external device 1000 is greater than the critical value, the gateway 2000 processes the sensing data with a first cycle (S2505), and if the remaining capacity of the battery in each external device 1000 is less than the critical value, the gateway 2000 may process the sensing data with a second cycle (S2507). That is, the gateway 2000 may change the period of processing the sensing data based on the state of the external device 1000, for example, the remaining capacity of the battery in the external device 1000. In this case, the gateway 2000 may receive information about the remaining capacity of the battery in the external device 1000 from the external device 1000. For example, the gateway 2000 may receive information about the remaining capacity of the battery in the external device 1000 from the external device 1000 whenever a certain event occurs or with a predetermined period. The gateway 2000 may receive status information of the external device 1000 (e.g., information indicating the remaining capacity of the battery, information indicating the resource utilization rate, and information indicating the network status) while receiving the sensing data from the external devices 1000.

When the remaining capacity of the battery in the external device 1000 is greater than the critical value, the external devices 1000 transmit the sensing data to the gateway 2000 with the first cycle, and the gateway 2000 may process the sensing data with the first cycle. When the remaining capacity of the battery in the external device 1000 is less than the critical value, the external devices 1000 may transmit the sensing data to the gateway 2000 with the second cycle, and the gateway 2000 may process the sensing data with the second cycle.

For example, if the remaining capacity of the battery in the external device 1000 is 80%, the external device 1000 may transmit the sensing data to the gateway 2000 once every second, and the gateway 2000 may process the sensing data transmitted from the external device 1000 once every second. If the remaining capacity of the battery in the external device 1000 is 20%, the external device 1000 transmits the sensing data to the gateway 2000 once every two seconds, and the gateway 2000 may process the sensing data transmitted from the external device 1000 once every two seconds.

Also, when the remaining capacity of the battery in the external device 1000 is less than the critical value, the gateway 2000 may request the external device 1000 to change the data transmission period. For example, when the critical value is 30% and the remaining capacity of the battery in the external device 1000 is 80% that is greater than the critical value, the external device 1000 may transmit the sensing data to the gateway 2000 once every second. When the remaining capacity of the battery in the external device 1000 is 20% that is less than the critical value, the gateway 2000 may request the external device 1000 to transmit the sensing data once every two seconds.

Also, if the remaining capacity of the battery in the external device 1000 is 20% that is less than the critical value, the gateway 2000 may receive the sensing data from the external device 1000 once every second, but may not process the sensing data.

Also, the gateway 2000 may determine the period of receiving the sensing data from the external device 1000, based on the remaining capacity of the battery in the external device 1000. If the remaining capacity of the battery in the external device 1000 is greater than the critical value, the gateway 2000 may receive the sensing data from the external device 1000 with the first cycle, and if the remaining capacity of the battery in the external device 1000 is less than the critical value, the gateway 2000 may receive the sensing data from the external device 1000 with the second cycle. For example, if the critical value is 30% and the remaining capacity of the battery in the external device 1000 is 80%, the gateway 2000 may receive the sensing data from the external device 1000 once every second, and if the remaining capacity of the battery in the external device 1000 is 20%, the gateway 2000 may receive the sensing data from the external device 1000 once every two seconds.

An exemplary embodiment may also be realized in a form of a computer-readable recording medium, such as a program module executed by a computer. A computer-readable recording medium may be an arbitrary available medium accessible by a computer, and examples thereof include all volatile and non-volatile media and separable and non-separable media. Further, examples of the computer-readable recording medium may include a computer storage medium and a communication medium. Examples of the computer storage medium include all volatile and non-volatile media and separable and non-separable media, which have been implemented by an arbitrary method or technology, for storing information such as computer-readable commands, data structures, program modules, and other data. The communication medium typically includes a computer-readable command, a data structure, a program module, other data of a modulated data signal, or another transmission mechanism, and an example thereof includes an arbitrary information transmission medium.

Also, herein, "unit" may be a hardware component such as a processor or a circuit and/or a software component executed by a hardware component such as a processor.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

While an exemplary embodiment have been described with reference to the figures, it will be understood by those of ordinary skill in the art that various changes in form and details may be made therein without departing from the spirit and scope as defined by the following claims.

What is claimed is:

1. A gateway for controlling at least one external device, the gateway comprising:
   a communicator configured to communicate with at least one external device; and
   a processor configured to:
     determine a resource utilization rate of the gateway,
     receive device information of the at least one external device from the at least one external device,
     identify a service provided by the at least one external device based on the device information of the at least one external device,
     determine a data transmission rule that indicates management of the sensing data received from the at least one external device based on the device information and the service provided by the at least one external device,
     determine a data providing method of providing sensing data from the at least one external device to the gateway according to the resource utilization rate of the gateway and the data transmission rule, and
     control the communicator to transmit, to the at least one external device, a signal that instructs the at least one external device to provide the sensing data according to the data providing method,
   wherein the data providing method comprises the at least one external device providing the sensing data to the gateway according to a predetermined size of the sensing data indicated by the signal.

2. The gateway of claim 1, wherein the data providing method comprises at least one data providing method selected from a data providing method of combining the sensing data, a data providing method of dividing the sensing data, and a data providing method of calculating an average value of the sensing data.

3. The gateway of claim 2, wherein the processor is further configured to determine the data providing method based on at least one of a kind of the sensing data of the at least one external device and a size of the sensing data of the at least one external device.

4. The gateway of claim 1, wherein the processor is further configured to select an external device among the at least one external device and determine the data providing method of the sensing data that is to be transmitted from the selected external device, when the resource utilization rate exceeds a critical value.

5. The gateway of claim 4, wherein the processor is further configured to control the communicator to transmit the signal for requesting the sensing data to the selected external device, and control the communicator to transmit to unselected external devices that are not selected, a signal for requesting the unselected external devices to pause the transmission of the sensing data.

6. The gateway of claim 4, further comprising a memory configured to store device information of the external device,
wherein the device information comprises information about a kind of the external device, a kind of the sensing data of the external device, and a sensing period of the external device.

7. The gateway of claim 6, wherein the processor is further configured to store in the memory the device information in association with a service provided by a device or a server connected to the gateway, and the processor is further configured to select a necessary external device from among the at least one external device for providing the sensing data used to provide the service.

8. The gateway of claim 1, wherein the processor is further configured to determine a transmission period of the sensing data from the at least one external device, and to control the communicator to transmit, to the at least one external device, the signal for requesting the at least one external device to provide the sensing data according to the determined transmission period.

9. The gateway of claim 1, wherein the resource utilization rate is determined based on at least one selected from a central processing unit (CPU) usage of the gateway, a memory usage of the gateway, and a communication state of the gateway.

10. The gateway of claim 1, wherein the processor is further configured to control the communicator to transmit, to the external device, a message requesting the external device to provide the sensing data according to a default transmission rule, when the resource utilization rate returns to a critical value.

11. A method for a gateway to control at least one external device, the method comprising:
determining a resource utilization rate of the gateway;
receiving device information of the at least one external device from the at least one external device;
identifying a service provided by the at least one external device based on the device information of the at least one external device;
determining a data transmission rule that indicates management of the sensing data received from the at least one external device based on the device information and the service provided by the at least one external device;
determining a data providing method of providing sensing data to the gateway from the at least one external device according to the resource utilization rate and the data transmission rule; and
transmitting, to the at least one external device, a signal that instructs the at least one external device to provide the sensing data according to the determined data providing method,
wherein the data providing method comprises the at least one external device providing the sensing data to the gateway according to a predetermined size of the sensing data indicated by the signal.

12. The method of claim 11, wherein the data providing method comprises at least one data providing method selected from a data providing method of combining the sensing data, a data providing method of dividing the sensing data, and a data providing method of calculating an average value of the sensing data.

13. The method of claim 12, wherein the determining of the data providing method comprises determining the data providing method based on at least one of a kind of the sensing data of the external device and a size of the sensing data.

14. The method of claim 11, further comprising selecting an external device among the at least one external device when the resource utilization rate exceeds a critical value,
wherein the determining of the data providing method comprises determining the data providing method of the sensing data that is to be provided from the selected external device.

15. The method of claim 14, wherein the transmitting of the control message comprises transmitting a signal for requesting the processed sensing data to the selected external device, and transmitting, to unselected external devices that are not selected, a message for requesting the unselected external devices to pause the transmission of the sensing data.

16. The method of claim 14, further comprising storing the device information of the identified external device,
wherein the device information of the external device comprises information about a kind of the external device, a kind of the sensing data of the external device, and a sensing period of the external device.

17. The method of claim 16, wherein the storing of the device information comprises storing the device information in association with a service provided by a device or a server connected to the gateway, and the selecting comprises selecting a necessary external device, from among the at least one external device for providing sensing data used to provide the service.

18. The method of claim 11, further comprising determining a transmission period of the sensing data from the at least one external device,
wherein the transmitting of the message comprises transmitting, to the at least one external device, a signal for requesting the at least one external device to provide the sensing data according to the transmission period that is determined.

19. A non-transitory computer-readable recording medium having embodied thereon a program for executing the method of claim 11 in a computer.

* * * * *